(12) United States Patent
Xu et al.

(10) Patent No.: US 11,721,861 B2
(45) Date of Patent: Aug. 8, 2023

(54) TOP COVER ASSEMBLY FOR BATTERY, BATTERY, AND ENERGY STORAGE DEVICE

(71) Applicant: Xiamen Hithium Energy Storage Technology Co., Ltd., Fujian (CN)

(72) Inventors: Weidong Xu, Fujian (CN); Nan Zhang, Fujian (CN); Ziqi Yi, Fujian (CN); Zuyu Wu, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/951,710

(22) Filed: Sep. 23, 2022

(65) Prior Publication Data
US 2023/0091615 A1    Mar. 23, 2023

(30) Foreign Application Priority Data

Sep. 23, 2021 (CN) .......................... 202111115734.0
Sep. 23, 2021 (CN) ......................... 202122307670.6

(51) Int. Cl.
| | | |
|---|---|---|
| *H01M 50/147* | (2021.01) | |
| *H01M 50/188* | (2021.01) | |
| *H01M 50/593* | (2021.01) | |

(52) U.S. Cl.
CPC ....... *H01M 50/147* (2021.01); *H01M 50/188* (2021.01); *H01M 50/593* (2021.01)

(58) Field of Classification Search
None
See application file for complete search history.

(56) References Cited

U.S. PATENT DOCUMENTS

2011/0200870 A1    8/2011  Kim et al.
2016/0336554 A1   11/2016  Negishi et al.

FOREIGN PATENT DOCUMENTS

| CN | 201149877 Y | 11/2008 |
| CN | 102157712 A | 8/2011 |
| CN | 108428819 A | 8/2018 |
| CN | 207690847 U | 8/2018 |
| CN | 213989022 U | 8/2021 |
| JP | 2012226834 A | 11/2012 |

OTHER PUBLICATIONS

CNIPA, Notification to Grant Patent Right for Invention for Chinese Patent Application No. 202111115734.0, dated Jan. 5, 2023, 3 pages.
CNIPA, First Office Action for corresponding Chinese Patent Application No. 202111115734.0, dated Nov. 2, 2022, 18 pages.

*Primary Examiner* — Zhongqing Wei
(74) *Attorney, Agent, or Firm* — IP Spring

(57) ABSTRACT

A top cover assembly for a battery, a battery, and an energy storage device are provided in the disclosure. The top cover assembly includes an insulating cover plate, a top cover plate, an insulating member, and a current collector stacked in sequence. A surface of the first flange close to the insulating member, an inner circumferential wall of the mounting hole, and a surface of the top cover plate close to the first flange and extending beyond the inner circumferential wall of the mounting hole define a sealing cavity. An inner circumferential wall of the through hole and an outer circumferential wall of the main body define a gap therebetween, the gap communicates with the sealing cavity, and a sealing member is received in the sealing cavity.

20 Claims, 26 Drawing Sheets

TOP COVER ASSEMBLY FOR BATTERY, BATTERY, AND ENERGY STORAGE DEVICE

CROSS-REFERENCE TO RELATED APPLICATION(S)

This application claims priority under 35 U.S.C. § 119(a) to and the benefit of Chinese Patent Application Serial No. 202122307670.6, filed Sep. 23, 2021, and Chinese Patent Application Serial No. 202111115734.0, filed Sep. 23, 2021, the entire disclosures of which are hereby incorporated by reference.

TECHNICAL FIELD

This disclosure relates to the technical field of batteries, and in particular, to a top cover assembly for a battery, a battery, and an energy storage device.

BACKGROUND

With the development of society, the aggravation of environmental pollution, and the depletion of traditional energy sources, people are becoming more and more aware of environmental protection. Lithium-ion batteries have become the first choice of green energy because of their high energy density, high voltage, low discharge rate, and long cycle life, and are therefore widely used in portable devices such as Bluetooth headsets, cell phones, digital cameras, and tablet computers, as well as large devices such as electric vehicles and energy storage power plants.

In comparison, cylindrical flexible packaging lithium-ion batteries have a better internal space utilization. Although cylindrical flexible packaging lithium-ion batteries have been put into practical applications, position of pole tabs of the existing cylindrical flexible packaging lithium-ion batteries is relatively fixed and therefore additional sealing processing is required for connections on each surface. This is likely to cause problems in sealing of the battery and the battery is prone to suffer deformation and liquid leakage during use.

SUMMARY

The disclosure aims to solve at least one of technical problems in related art. To this end, a top cover assembly for a battery is provided in the disclosure.

A battery is also provided in the disclosure. The battery includes the above-mentioned top cover assembly for a battery.

An energy storage device is also provided in the disclosure. The energy storage device includes the above-mentioned battery.

The top cover assembly for a battery according to the disclosure includes an insulating cover plate, a top cover plate, an insulating member, a current collector, and a pole. The insulating cover plate defines a mounting hole and has a mounting portion. The top cover plate is stacked with the insulating cover plate and defines a through hole. The through hole is opposite to the mounting hole. The insulating member is located on a side of the top cover plate away from the insulating cover plate and defines a positioning hole. The positioning hole is opposite to the through hole. The current collector is disposed on a side of the insulating cover plate away from the top cover plate and mounted on the mounting portion.

The pole is connected with the current collector and has a main body and a first flange. The first flange is located at an edge of one end of the main body close to the current collector, projects from a circumferential wall surface of the main body, and abuts against the insulating cover plate. The main body extends through the positioning hole, the through hole, and the mounting hole. A surface of the first flange close to the insulating member, an inner circumferential wall of the mounting hole, and a surface of the top cover plate close to the first flange and extending beyond the inner circumferential wall of the mounting hole define a sealing cavity. An inner circumferential wall of the through hole and an outer circumferential wall of the main body define a gap therebetween. The gap communicates with the sealing cavity. A sealing member is received in the sealing cavity.

In the top cover assembly for a battery according to implementations of the disclosure, the sealing cavity is constructed by using the pole, the insulating member, the top cover plate, and the insulating cover plate, and the sealing cavity is in communication with the gap between the inner circumferential wall of the through hole and the outer circumferential wall of the main body. When the sealing member is assembled into the sealing cavity, part of the sealing member can be deformed under the action of an extrusion force to block an opening, which improves a sealing effect of the sealing member.

In some implementations, the sealing member is sleeved on the main body and abuts against the first flange.

In some implementations, the top cover plate has a stepped portion abutting against the sealing member.

In some implementations, the top cover assembly further includes a pressing block. The pressing block is disposed on a side of the insulating member away from the top cover plate and defines a limiting hole opposite to the positioning hole.

In some implementations, the pressing block has a fitting protrusion on a side of the pressing block close to the insulating member. The insulating member defines a fitting groove on a side of the insulating member close to the pressing block. The fitting protrusion fits with the fitting groove.

In some implementations, the pole further has a second flange. The second flange is located at an edge of the other end of the main body and projects from the circumferential wall surface of the main body. The second flange extends in a circumferential direction of the main body and abuts against the pressing block.

In some implementations, the pressing block, the insulating member, the top cover plate, and the insulating cover plate are sandwiched between the second flange and the first flange.

In some implementations, the mounting hole has a cross-section gradually decreased in area in a direction from the first flange to the second flange.

In some implementations, the limiting hole has a first hole section, a second hole section, and a third hole section which communicate in sequence. The first hole section has a radial size larger than the second hole section. The second flange is received in the second hole section, and part of the main body is received in the third hole section.

In some implementations, the limiting hole has a first chamfer on an end of the limiting hole close to the insulating member.

In some implementations, the top cover plate defines an anti-rotation groove. The through hole is defined in the anti-rotation groove.

The insulating member has an anti-rotation flange on a circumferential wall of the insulating member. The anti-rotation flange is embedded in the anti-rotation groove.

In some implementations, the anti-rotation flange includes a first anti-rotation edge and a second anti-rotation edge. The first anti-rotation edge and the second anti-rotation edge define an included angle.

In some implementations, the anti-rotation flange includes multiple anti-rotation flanges spaced apart in a circumferential direction of the insulating member.

In some implementations, the anti-rotation groove is square.

In some implementations, the insulating member has a boss on a side of the insulating member close to the top cover plate. The positioning hole extends through the boss, and the boss is received in the through hole.

In some implementations, the boss has a second chamfer between an end surface of the boss and an inner circumferential wall of the positioning hole.

In some implementations, the boss has a third chamfer between an end surface and an outer circumferential wall of the boss.

The battery according to implementations of the disclosure includes the above-mentioned top cover assembly for a battery.

In the battery according to the implementations of the disclosure, the sealing cavity is constructed by using the pole, the pressing block, the insulating member, the top cover plate, and the insulating cover plate, and the sealing cavity is in communication with the gap between the inner circumferential wall of the through hole and the outer circumferential wall of the main body. When the sealing member is assembled into the sealing cavity, part of the sealing member can be deformed under the action of an extrusion force to block an opening, which improves the sealing effect of the sealing member.

The energy storage device according to implementations of the disclosure includes the above-mentioned battery.

In the energy storage device according to the implementations of the disclosure, the sealing cavity is constructed by using the pole, the pressing block, the insulating member, the top cover plate, and the insulating cover plate, and the sealing cavity is in communication with the gap between the inner circumferential wall of the through hole and the outer circumferential wall of the main body. When the sealing member is assembled into the sealing cavity, part of the sealing member can be deformed under the action of an extrusion force to block an opening, which improves the sealing effect of the sealing member.

BRIEF DESCRIPTION OF THE DRAWINGS

The above and/or additional aspects and advantages of the disclosure will become clear and better appreciated from implementations described in conjunction with the following accompanying drawings, wherein.

Figure 1:
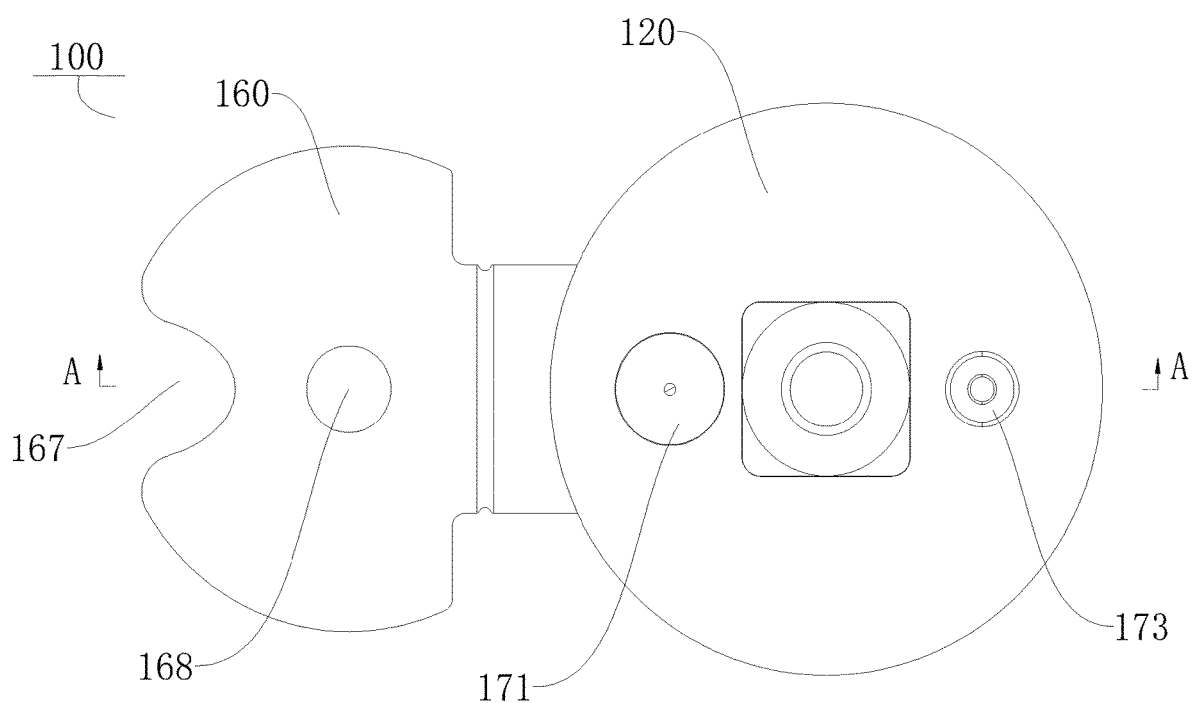
FIG. 1 is a top view of a top cover assembly for a battery according to implementations of the disclosure.

REFERENCE SIGNS top cover assembly: 100; insulating cover plate: 110; mounting hole: 111; limiting rib: 112; first limiting rib: 113; second limiting rib: 114; third limiting rib: 115; reinforcing rib: 116; abutment portion: 117; protective flange: 118; bending edge: 119; top cover plate: 120; through hole: 121; anti-rotation groove: 122; abutment protrusion: 123; stepped portion: 124; insulating member: 130; positioning hole: 131; boss: 132; second chamfer: 133; third chamfer: 134; fitting groove: 135; anti-rotation flange: 136; first anti-rotation edge: 137; second anti-rotation edge: 138; pressing block: 140; limiting hole: 141; first chamfer: 142; first hole section:

143; second hole section: 144; third hole section: 145; fitting protrusion: 146; pole: 150; main body: 151; second flange: 152; first flange: 153; sealing cavity: 154; gap: 155; sealing member: 156; current collector: 160; first crease: 161; first groove: 1611; second crease: 162; second groove: 1621; first part: 163; second part: 164; third part: 165; enlarged section: 166; avoidance gap: 167; avoidance hole: 168; explosion-proof hole: 170; explosion-proof valve: 171; liquid-injection hole: 172; liquid-injection hole plug: 173; battery: 1000; case: 200; electrode pin: 300; energy storage device: 2000; housing: 2200; opening: 157.

DETAILED DESCRIPTION

Exemplary implementations of the disclosure will be described in detail hereinafter with reference to the accompanying drawings.

In the implementations of the disclosure, terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential" referred to herein which indicate directional relationship or positional relationship are directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

In addition, terms "first", "second", and the like are only used for description and cannot be understood as explicitly or implicitly indicating relative importance or implicitly indicating the number of technical features referred to herein. Therefore, features restricted by terms "first", "second", and the like can explicitly or implicitly include at least one of the features. In the context of the disclosure, unless stated otherwise, "multiple" refers to "at least two", such as two, three, and the like.

A top cover assembly 100 for a battery 1000 according to implementations of the disclosure is described hereinafter with reference to FIGS. 1-30. The top cover assembly 100 includes an insulating cover plate 110, a top cover plate 120, an insulating member 130, a current collector 160, and a pole 150. For example, the insulating cover plate 110 can be a lower plastic, the insulating member 130 can be an upper plastic. The top cover assembly for a battery 1000 has advantages of good sealing and simple structure.

Figure 2:
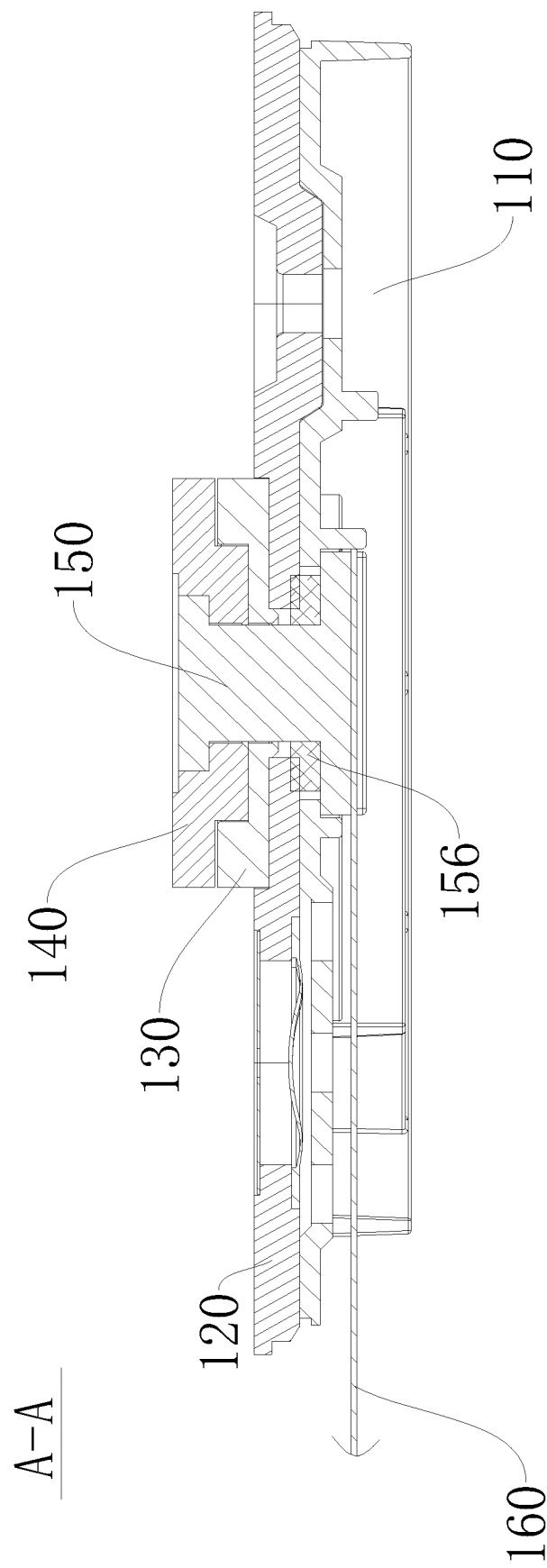
FIG. 2 is a cross-sectional view in direction A-A in FIG. 1.
Figure 3:
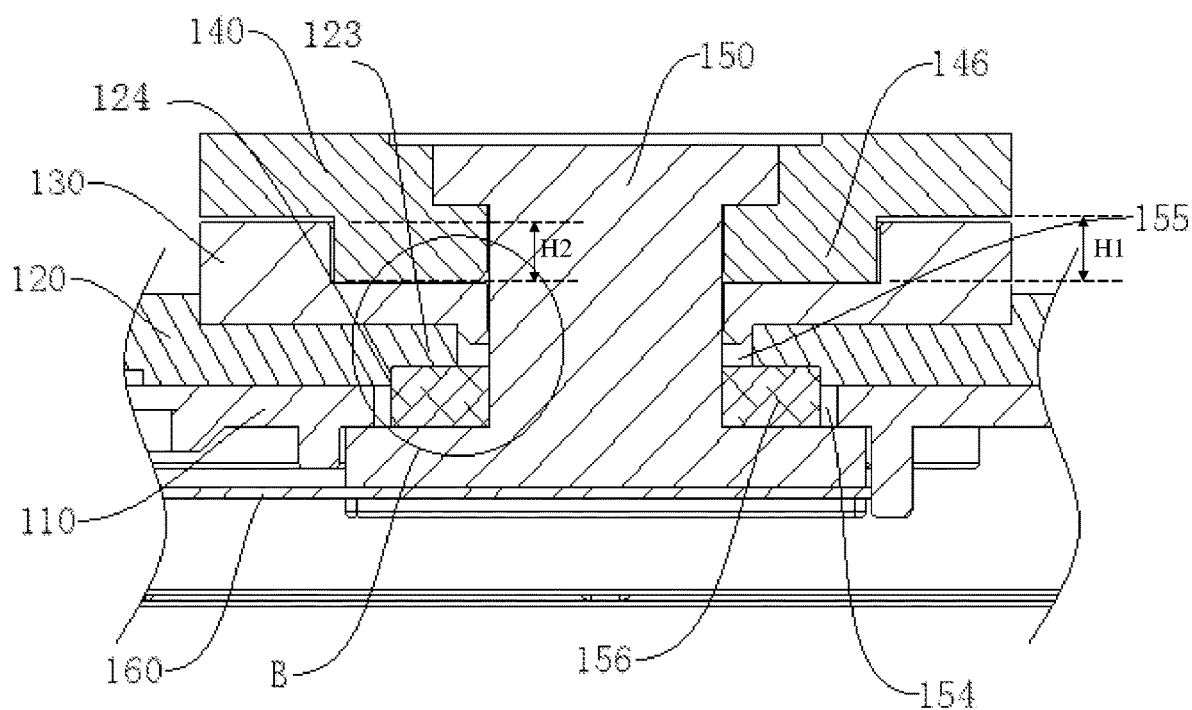
FIG. 3 is a partial schematic structural view of the top cover assembly for a battery in FIG. 2.
Figure 5:
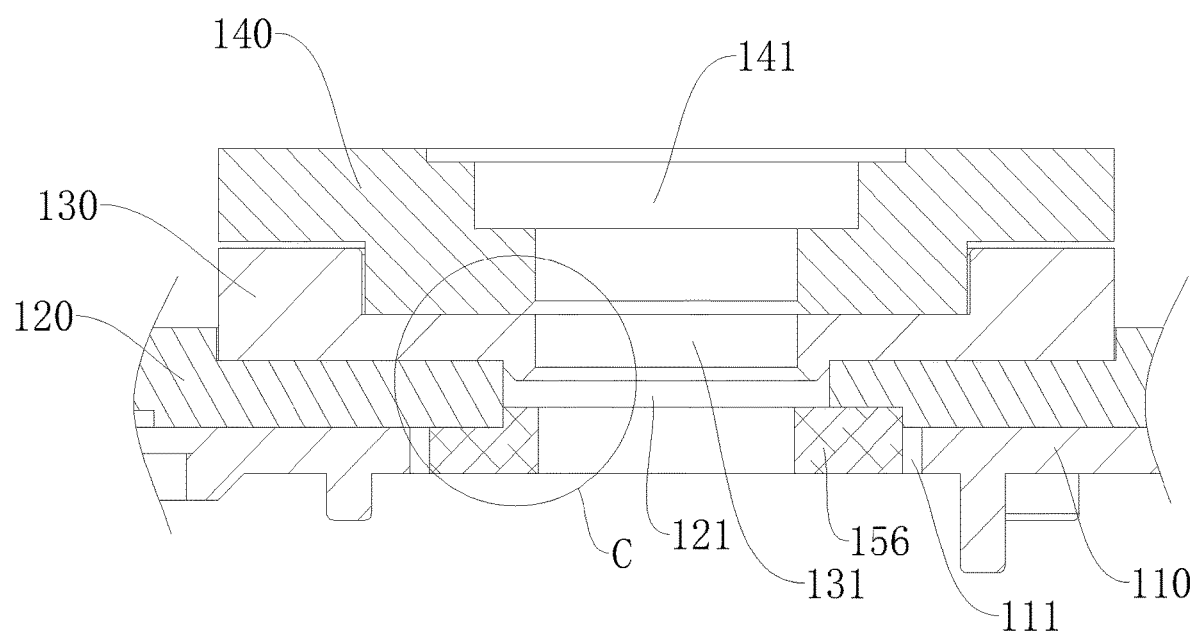
FIG. 5 is a partial structural schematic view of the top cover assembly for a battery in FIG. 2, with a pole omitted.
Figure 6:
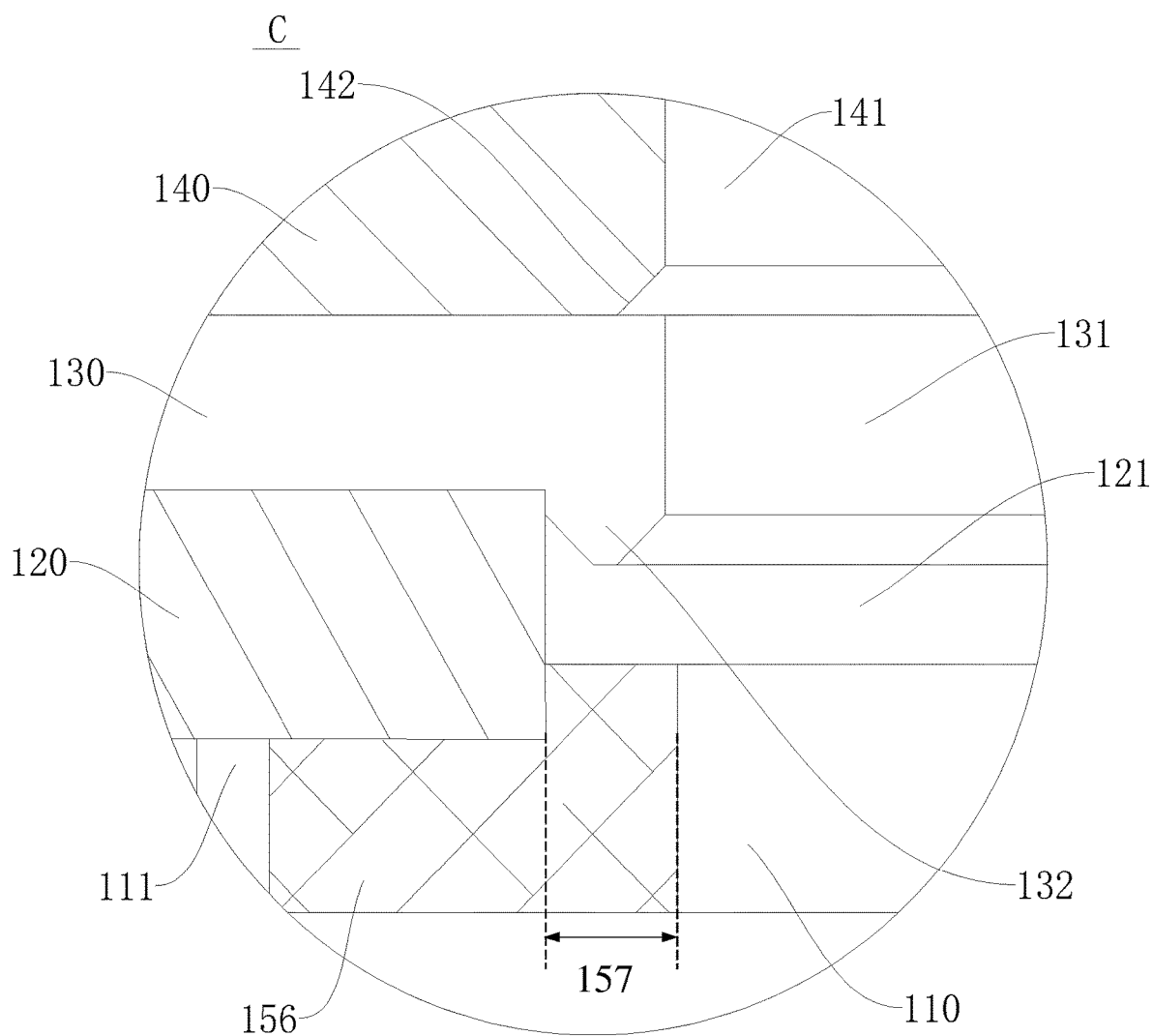
FIG. 6 is a partial enlarged schematic view at circle C in FIG. 5.
Figure 7:
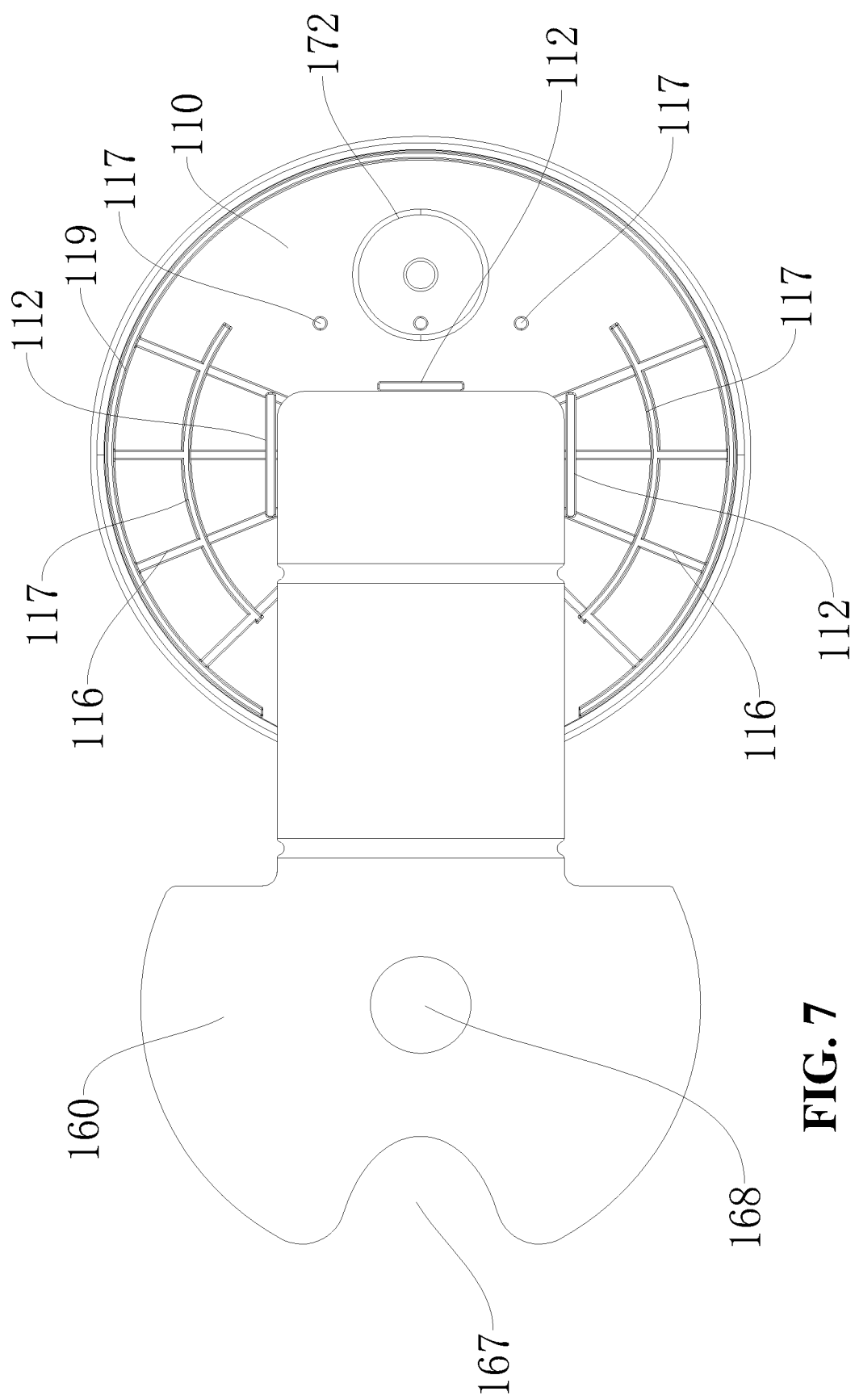
FIG. 7 is a top view of a top cover assembly for a battery according to implementations of the disclosure.
Figure 8:
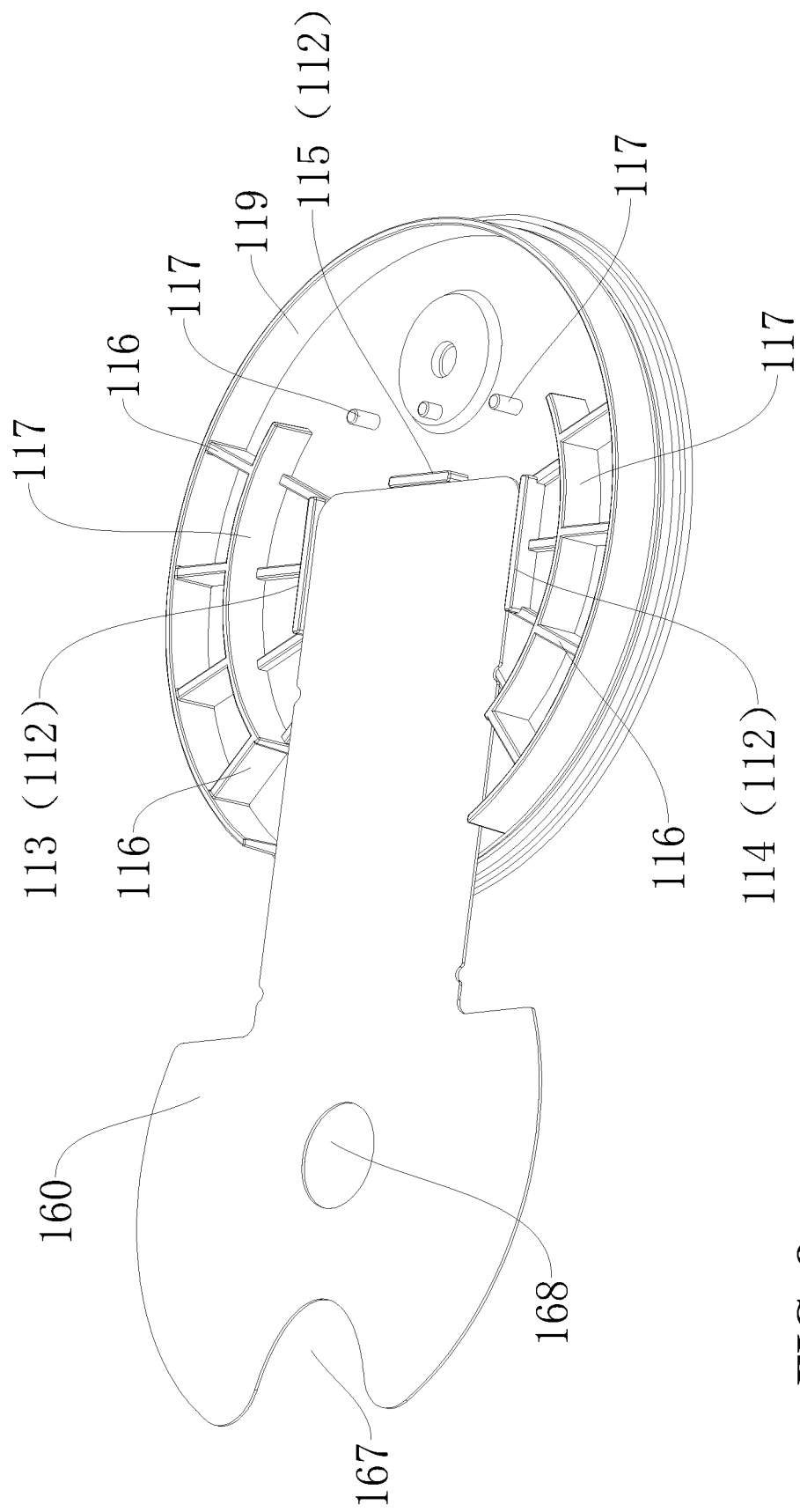
FIG. 8 is an isometric view of a top cover assembly for a battery according to implementations of the disclosure.
Figure 9:
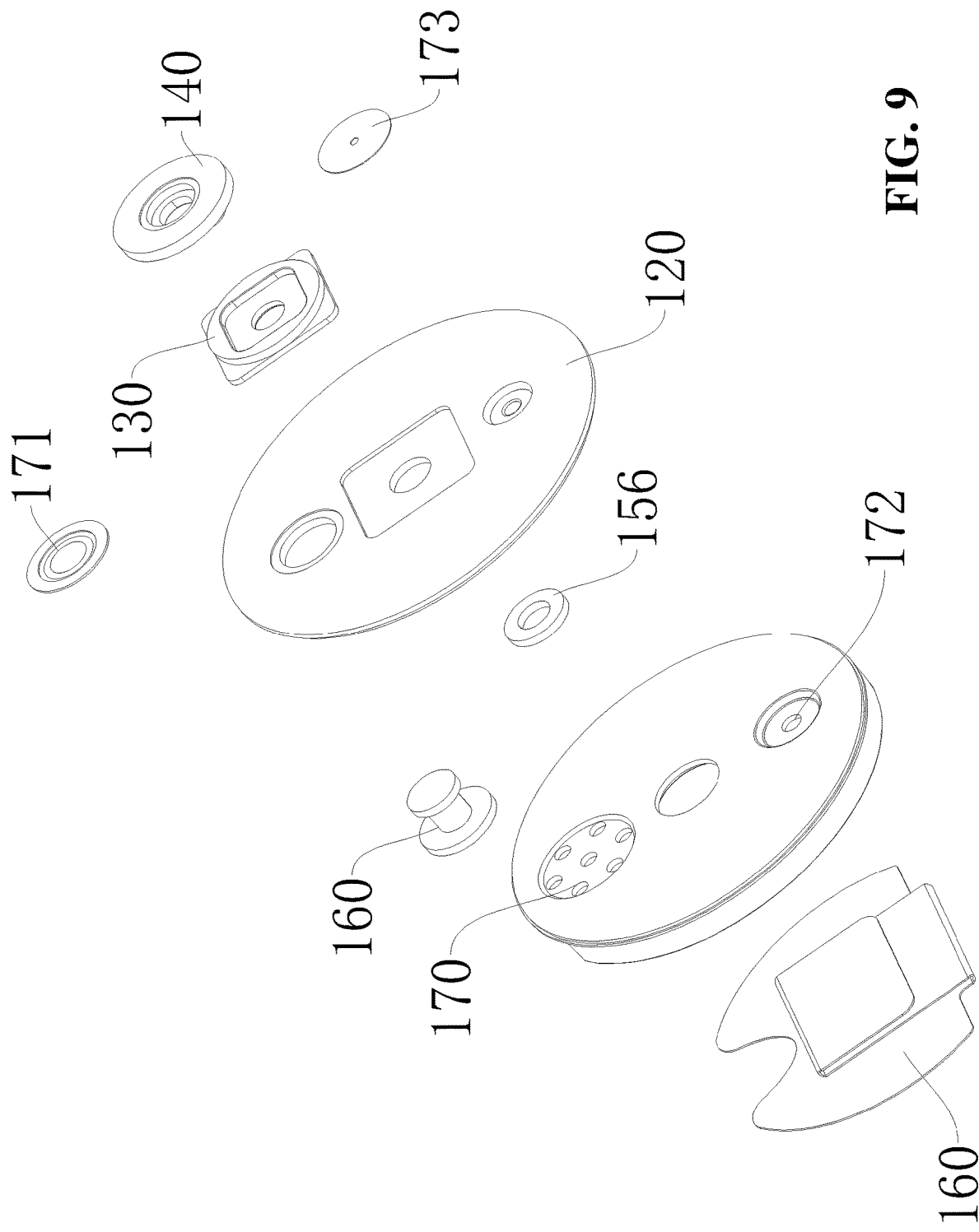
FIG. 9 is an exploded view of a top cover assembly for a battery according to implementations of the disclosure.

In an implementation, as illustrated in FIGS. 1-3, the insulating cover plate 110, the top cover plate 120, the insulating member 130, and the pressing block 140 are stacked in sequence from bottom to top. As illustrated in FIG. 5 and FIG. 6, the insulating cover plate 110 defines a mounting hole 111, the top cover plate 120 defines a through hole 121, the insulating member 130 defines a positioning hole 131, and the pressing block 140 defines a limiting hole 141. The mounting hole 111, the through hole 121, the positioning hole 131, and the limiting hole 141 are opposite to and communicate with one another in sequence to form a through hole in which the pole 150 can be mounted.

Figure 10:
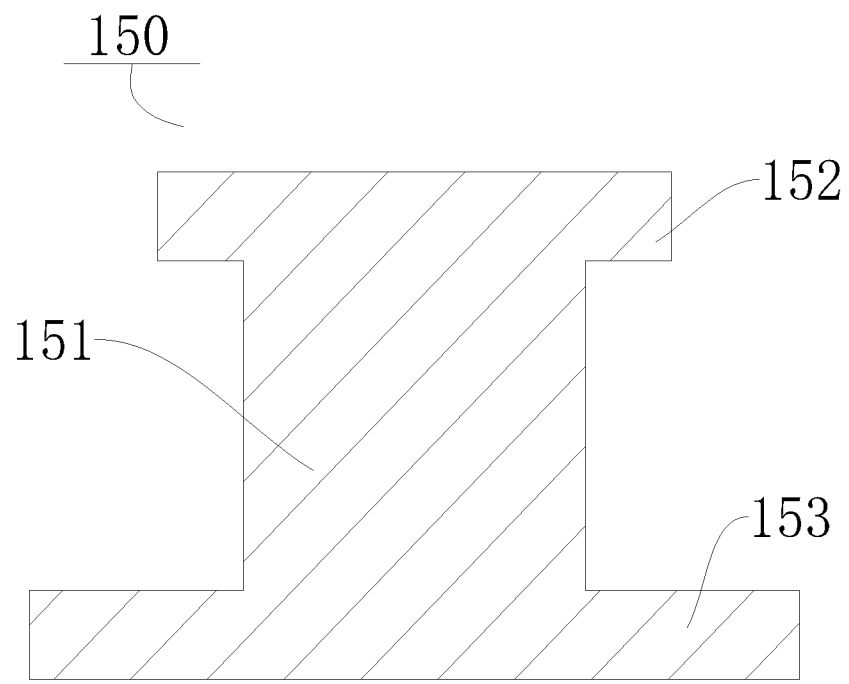
FIG. 10 is a schematic cross-sectional view of a pole in FIG. 9.
Figure 11:
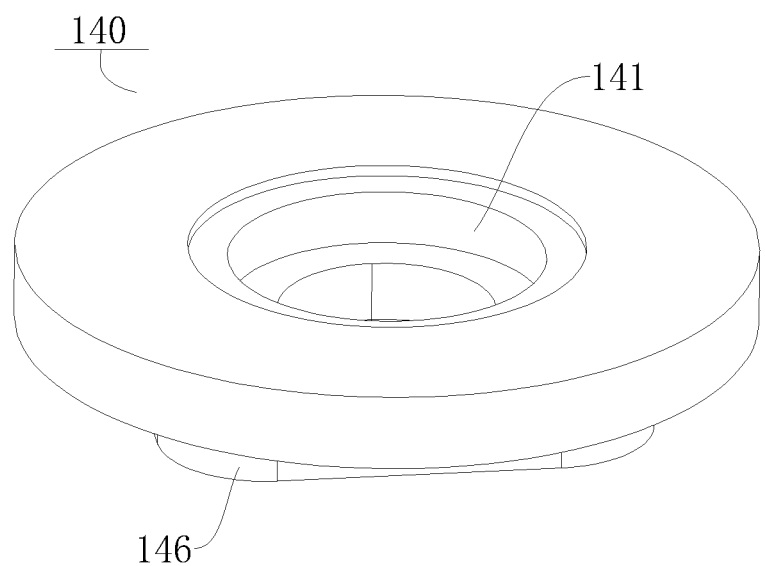
FIG. 11 is an isometric view of a pressing block in FIG. 9 from one view.
Figure 12:
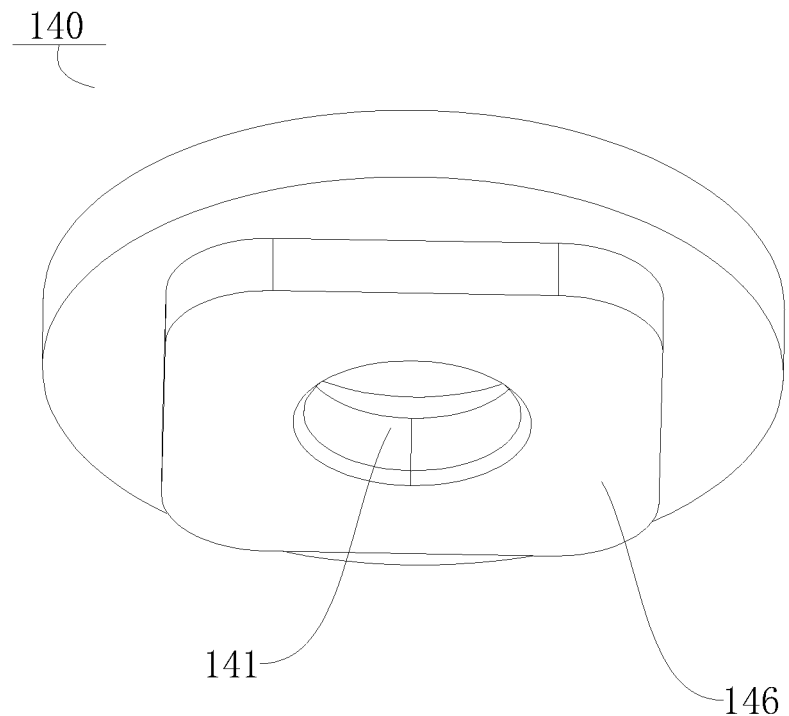
FIG. 12 is an isometric view of the pressing block in FIG. 9 from another view.

As illustrated in FIG. 3 and FIG. 10, the pole 150 can have a main body 151 and a first flange 153. For example, the main body 151 is cylindrical. The first flange 153 is located at an edge of one end of the main body 151. The first flange 153 projects from a circumferential wall surface of the main body 151. The first flange 153 extends in a circumferential direction of the main body 151.

A surface of the first flange 153 close to the insulating member 130, an inner circumferential wall of the mounting hole 111, and a surface of the top cover plate 120 close to the first flange 153 and extending beyond the inner circumferential wall of the mounting hole 111 define a sealing cavity 154. A sealing member 156 is received in the sealing cavity 154. For example, the top cover plate 120 has an abutment protrusion. The abutment protrusion projects from the inner circumferential wall of the mounting hole 111 in a radial direction of the top cover plate 120. At least part of the abutment protrusion 123 is opposite to the mounting hole 111. A surface of the abutment protrusion 123 close to the first flange 153, the surface of the first flange 153 close to the main body 151, and the inner circumferential wall of the mounting hole 111 corporately define the sealing cavity 154.

The current collector 160 is disposed on a side of the insulating cover plate 110 away from the top cover plate 120. The current collector 160 is mounted on a mounting portion. The current collector 160 is connected with the pole 150. With aid of the mounting portion, reliability of mounting the current collector 160 can be improved, which facilitates stability of a connection between the current collector 160 and the pole 150. At the same time, it is beneficial to a sealing effect of the top cover assembly 100.

Figure 4:
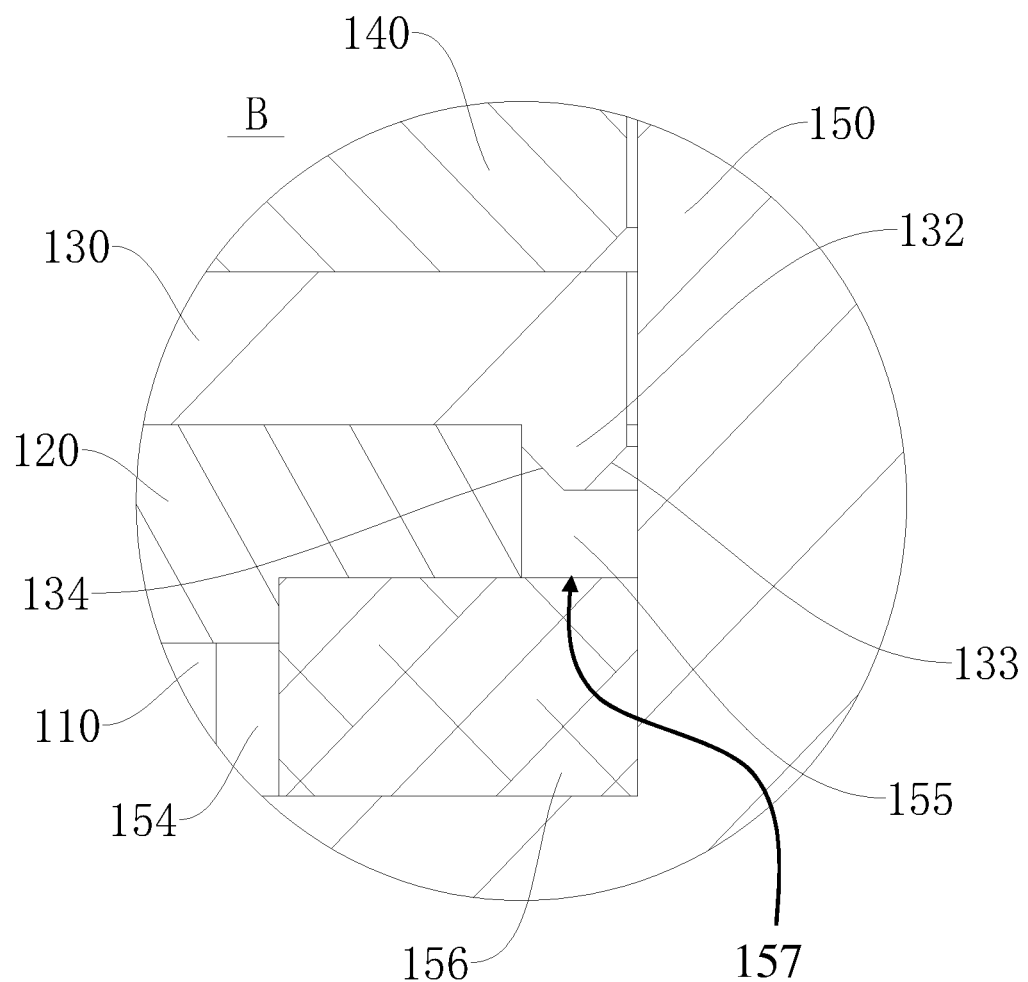
FIG. 4 is a partial enlarged schematic view at circle B in FIG. 3.

As illustrated in FIG. 4, an inner circumferential wall of the through hole 121 and an outer circumferential wall of the main body 151 define a gap therebetween. The gap 155 communicates with the sealing cavity 154. That is, the sealing cavity 154 has an opening 157 at a position close to the gap 155, and the sealing cavity 154 communicates with the gap 155 via the opening 157. As such, when the sealing member 156 is assembled into the sealing cavity 154, an inner wall of the sealing cavity 154 extrudes the sealing member 156. Under the action of an extrusion force, part of the sealing member 156 is deformed. Since the sealing cavity 154 is in communication with the gap 155, the sealing member 156 is deformed toward an interior of the gap 155. Here, the part of the sealing member 156 can block the opening 157, which can improve the sealing effect of the sealing member 156.

In the top cover assembly 100 for a battery 1000 according to the implementations of the disclosure, the sealing cavity 154 is constructed by using the pole 150, the insulating member 130, the top cover plate 120, and the insulating cover plate 110. The sealing cavity 154 is in communication with the gap 155 between the inner circumferential wall of the through hole 121 and the outer circumferential wall of the main body 151. When the sealing member 156 is assembled into the sealing cavity 154, part of the sealing member 156 can be deformed under the action of an extrusion force to block an opening 157, which improves the sealing effect of the sealing member 156.

As illustrated in FIG. 3, the main body 151 extends through the positioning hole 131, the through hole 121, and the mounting hole 111. The second flange 152 abuts against the pressing block 140. The first flange 153 abuts against the insulating cover plate 110. Here, the second flange 152 and the first flange 153 can press and fix the stacked pressing block 140, the insulating member 130, the top cover plate 120, and the insulating cover plate 110, which can improve stability of the top cover assembly 100. Further, the main body 151 extends through the limiting hole 141, the positioning hole 131, the through hole 121, and the mounting hole 111. The second flange 152 abuts against the pressing block 140.

In some implementations, the pressing block 140, the insulating member 130, the top cover plate 120, and the insulating cover plate 110 are sandwiched between the second flange 152 and the first flange 153. As such, reliability of mounting the pole 150 with the pressing block 140, the insulating member 130, the top cover plate 120, and the insulating cover plate 110 can be ensured, and the sealing effect can also be improved.

In some examples, the pole 150, the pressing block 140, the insulating member 130, the top cover plate 120, and the insulating cover plate 110 can cooperate to define the sealing cavity 154, which can further improve sealing of the top cover assembly 100.

In some implementations, as illustrated in FIG. 5, the sealing member 156 may be sleeved on the main body 151 and abut against the first flange 153. For example, the sealing member 156 is a sealing ring. The sealing ring is sleeved on the outer circumferential wall of the main body 151 and abuts against the first flange 153. As such, installation stability of the sealing member 156 and the pole 150 can be improved, which is beneficial to the sealing effect.

In some implementations, as illustrated in FIG. 3, the top cover plate 120 may have a stepped portion 124. The stepped portion 124 abuts against the sealing member 156. In this way, on the one hand, it can facilitate positioning and assembly, and on the other hand, it can facilitate improvement of the sealing effect. For example, the stepped portion 124 is formed on the surface of the top cover plate 120 close to the first flange 153 and projecting from the inner circumferential wall of the mounting hole 111.

In some implementations, the top cover assembly 100 further includes a pressing block 140. The pressing block 140 is disposed on a side of the insulating member 130 away from the top cover plate 120. A limiting hole 141 is defined in the pressing block 140. The limiting hole 141 opposites to the positioning hole 131. With aid of the pressing block 140, the sealing effect of the top cover assembly 100 can be further improved, and the pole 150 can extend through the limiting hole 141.

In some implementations, the pole 150 further has a second flange 152. The second flange 152 is located at an edge of the other end of the main body 151 (for example, a side of the main body 151 away from the current collector 160) and projects from the circumferential wall surface of the main body 151. The second flange 152 extends in a circumferential direction of the main body 151.

For example, as illustrated in FIGS. 4 to 6, a hole diameter of the through hole 121 is smaller than that of the mounting hole 111. A hole diameter of the positioning hole 131 is smaller than that of the through hole 121. As such, a through hole constructed by the through hole 121, the mounting hole 111, and the positioning hole 131 can have multiple hole segments with different diameters.

According to some implementations of the disclosure, the mounting hole 111 has a cross-section gradually decreased in area in a direction from the first flange 153 to the second flange 152. It can be noted that for the mounting hole 111, the cross-section thereof is gradually decreased in area, so that a circumferential wall of the mounting hole 111 can be structured into an inclined circumferential wall. When the sealing member 156 is assembled into the mounting hole 111, the inclined circumferential wall has an extrusion effect on the sealing member 156, which can drive the sealing member 156 to deform toward the gap 155, thereby improving the sealing effect of the sealing member 156.

Figure 13:
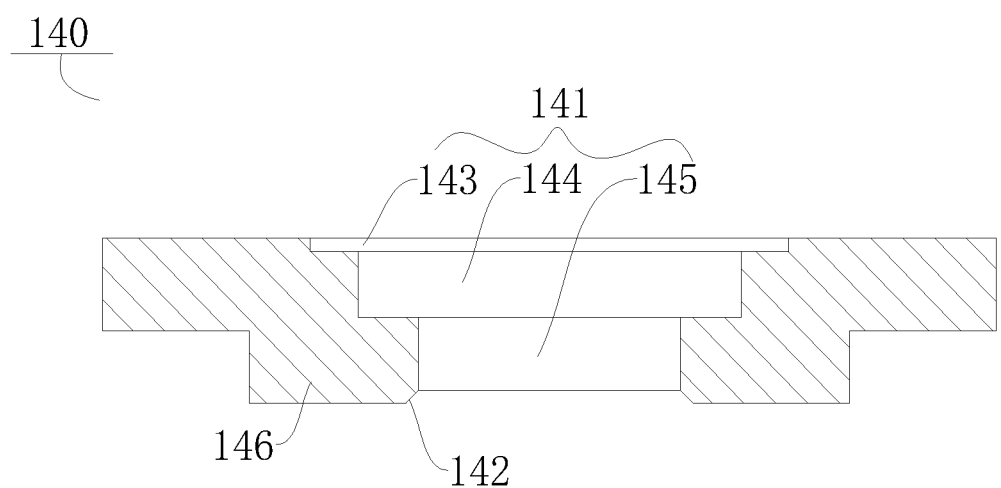
FIG. 13 is a schematic cross-sectional view of the pressing block in FIG. 9.

In an example illustrated in FIG. 13 and FIG. 6, the limiting hole 141 has a first chamfer 142 on an end of the limiting hole 141 close to the insulating member 130. On the one hand, with aid of a chamfering structure, a cutting stress during processing the pressing block 140 can be eliminated, which can improve structural strength of the pressing block 140. On the other hand, when assembling the pole 150, with aid of the first chamfer 142 which acts as a guide, the pole 150 can be guided to extend through the limiting hole 141.

According to some implementations of the disclosure, as illustrated in FIG. 13, the limiting hole 141 has a first hole section 143, a second hole section 144, and a third hole section 145 which communicate in sequence. In an implementation, the second flange 152 is received in the second hole section 144. Part of the main body 151 is received in the third hole section 145. It is noted that, the second hole section 144 and the third hole section 145 can be used to receive the pole 150. The first hole section 143 has a radial size larger than the second hole section 144. In a case that an end of the pole 150 in the second hole section 144 needs to be soldered, an inner space of the first hole section 143 can be used to accommodate solder. In a case that the end of the pole 150 in the second hole section 144 needs to be riveted, the end of the pole 150 will deform to generate a protrusion after riveting, and the inner space of the first hole section 143 can be used for receiving the protrusion.

Further, as illustrated in FIG. 3, a surface of the second flange 152 away from the first flange 153 is flush with an inner bottom wall of the first hole section 143. As such, it is convenient to weld or rive the pole 150, and the pole 150 will not occupy the inner space of the first hole section 143. Therefore, the first hole section 143 can accommodate solder or a riveting protrusion of the pole 150 to prevent the solder from overflowing or prevent the protrusion from extending beyond a surface of the pressing block 140.

Figure 17:
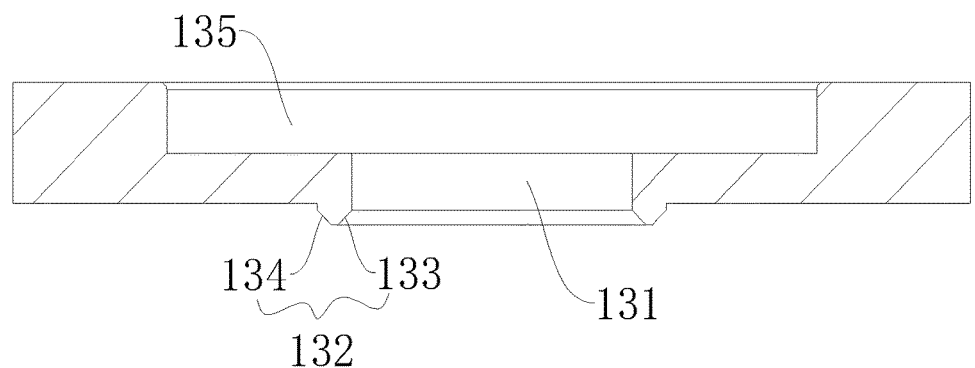
FIG. 17 is a cross-sectional view of the insulating member in FIG. 9.

According to some implementations of the disclosure, as illustrated in FIGS. 3, 13, and 17, the pressing block 140 has a fitting protrusion 146 on a side of the pressing block 140 close to the insulating member 130. The insulating member 130 defines a fitting groove 135 on a side of the insulating member 130 close to the pressing block 140. The fitting protrusion 146 fits with the fitting groove 135. A height of the fitting protrusion 146 projecting from the surface of the pressing block 140 is H1, and a depth of the fitting groove 135 is H2, where H1>H2. That is, the height of the fitting protrusion 146 is larger than the height of the fitting groove 135. As such, when the fitting protrusion 146 fits with the fitting groove 135, the fitting protrusion 146 will support the entire pressing block 140 so that the rest of the pressing block 140 other than the fitting protrusion 146 is spaced apart from the insulating member 130. Under the action of an assembly force of the top cover assembly 100, the fitting protrusion 146 will be in close contact with an inner bottom wall of the fitting groove 135, thereby improving sealing between the pressing block 140 and the insulating member 130. In order to prevent a relative rotation between the pressing block 140 and the insulating member 130, in some implementations, the fitting groove 135 is square.

Figure 14:
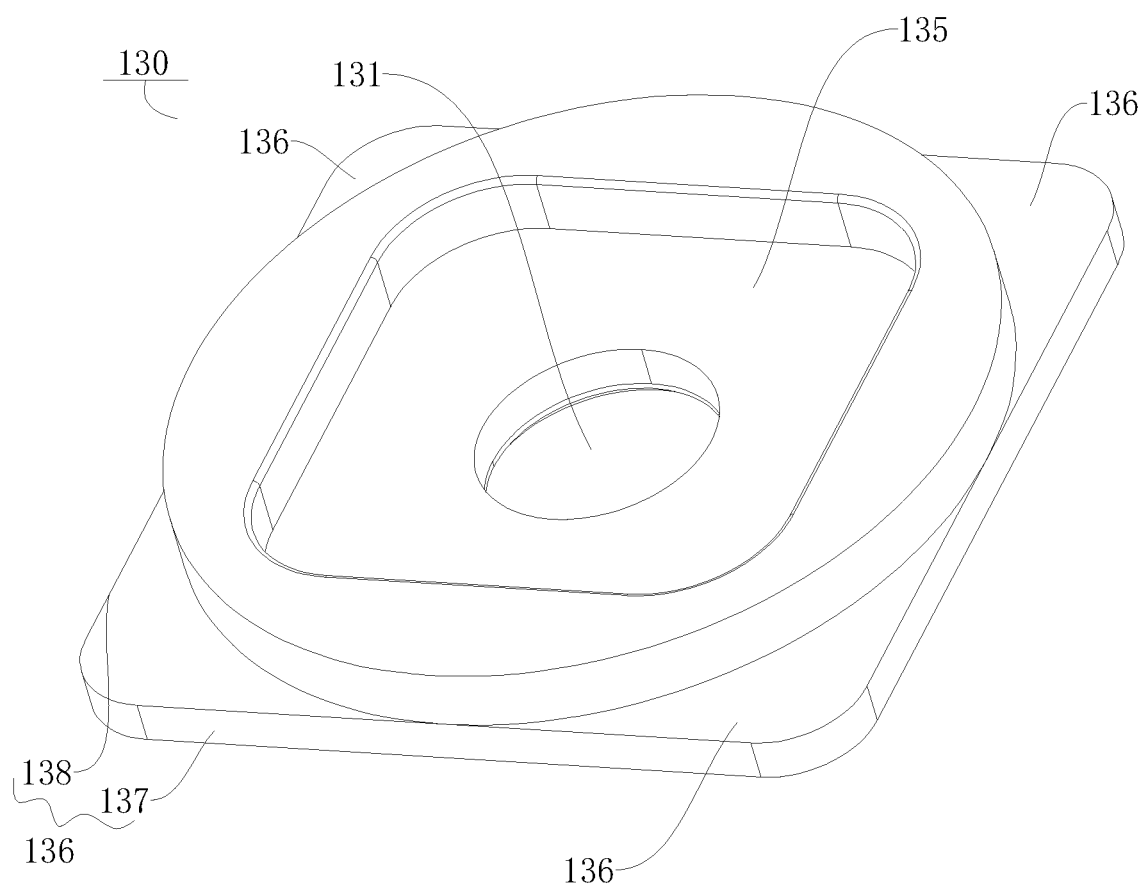
FIG. 14 is an isometric view of an insulating member in FIG. 9 from one view.
Figure 15:
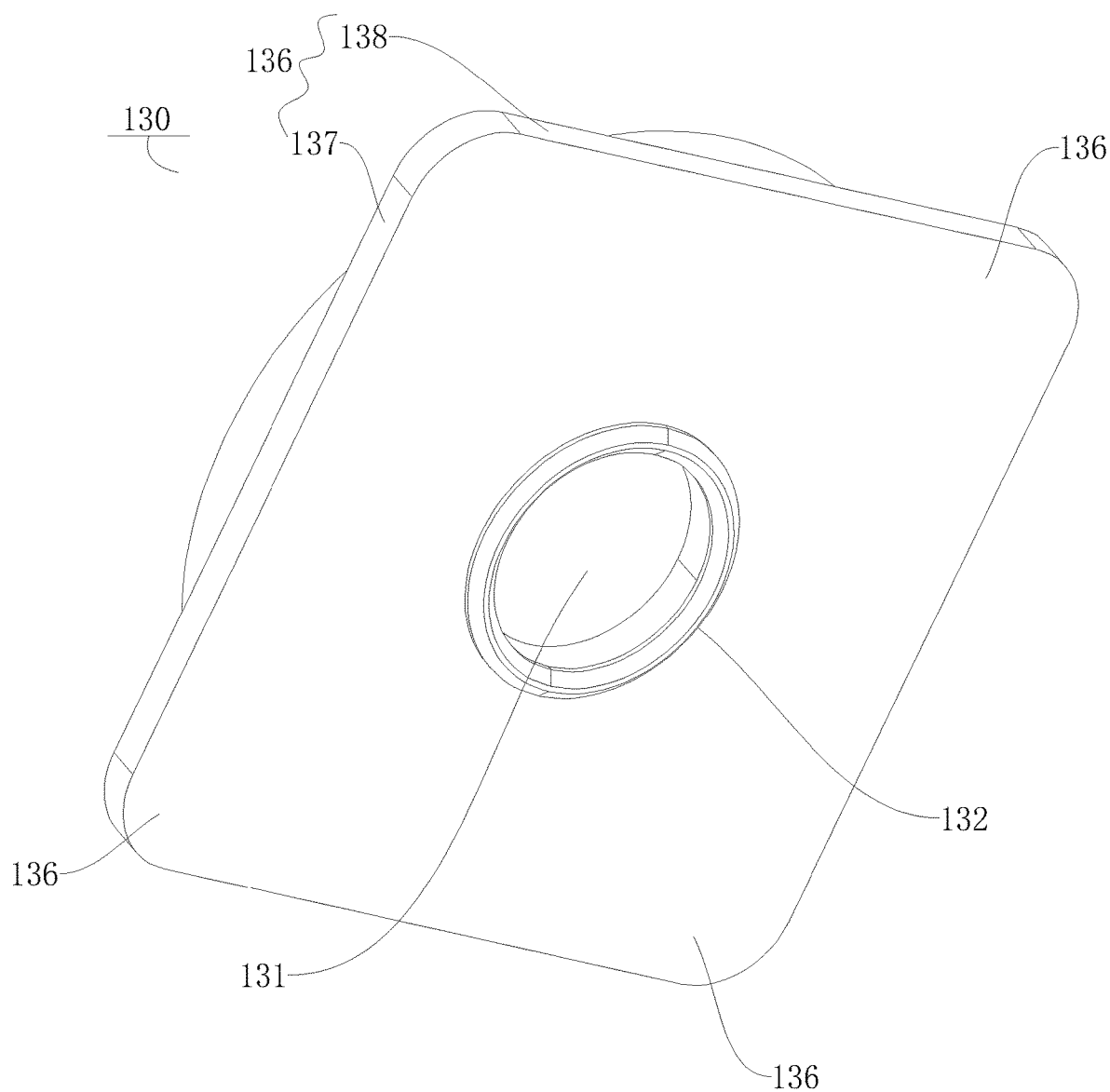
FIG. 15 is an isometric view of an insulating member in FIG. 9 from another view.
Figure 16:
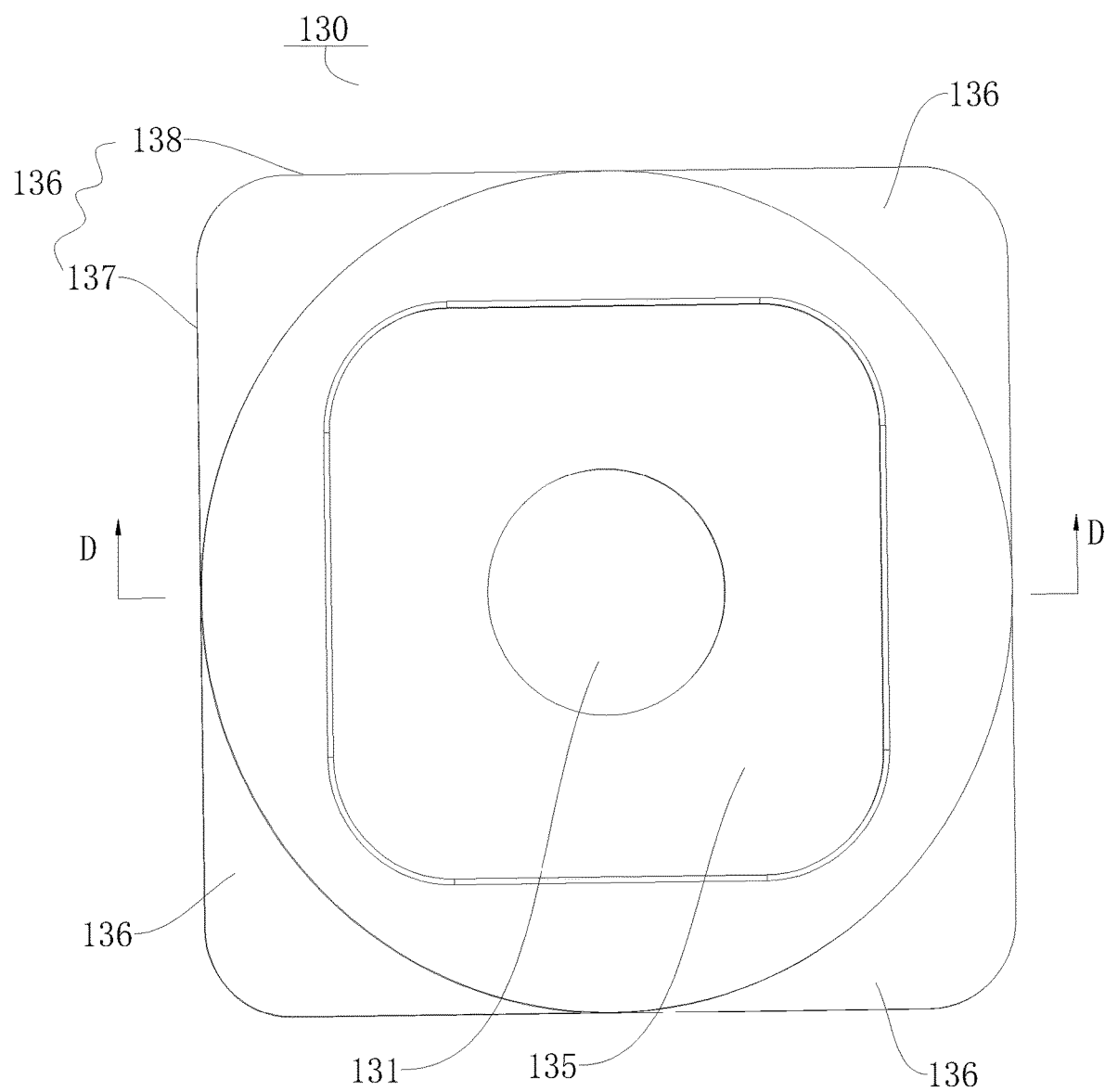
FIG. 16 is a top view of the insulating member in FIG. 9.

According to some implementations of the disclosure, as illustrated in FIGS. 14-16, the insulating member 130 has a boss 132 on a side of the insulating member 130 close to the top cover plate 120. The positioning hole 131 extends through the boss 132. The boss 132 is received in the through hole 121. As such, during assembly, the boss 132 can be received in the through hole 121 for pre-positioning, which facilitates assembling of the insulating member 130 and the top cover plate 120. Further, as illustrated in FIG. 17, the boss 132 has a second chamfer 133 between an end surface of the boss 132 and an inner circumferential wall of the positioning hole 131. The boss 132 has a third chamfer 134 between an end surface and an outer circumferential wall of the boss 132.

It is noted that the boss 132 has chamfered structures at an end corner of the boss 132 in a radial direction. On the one hand, with aid of the chamfering structures, a cutting stress during processing of the pressing block 140 can be eliminated, which can improve structural strength of the pressing block 140. On the other hand, with aid of the third chamfer 134 which acts as a guide, the boss 132 can be guided into the through hole 121 during assembly, and with aid of the second chamfer 133 which acts as a guide, the pole 150 can be guided to be received in the positioning hole 131.

Figure 25:
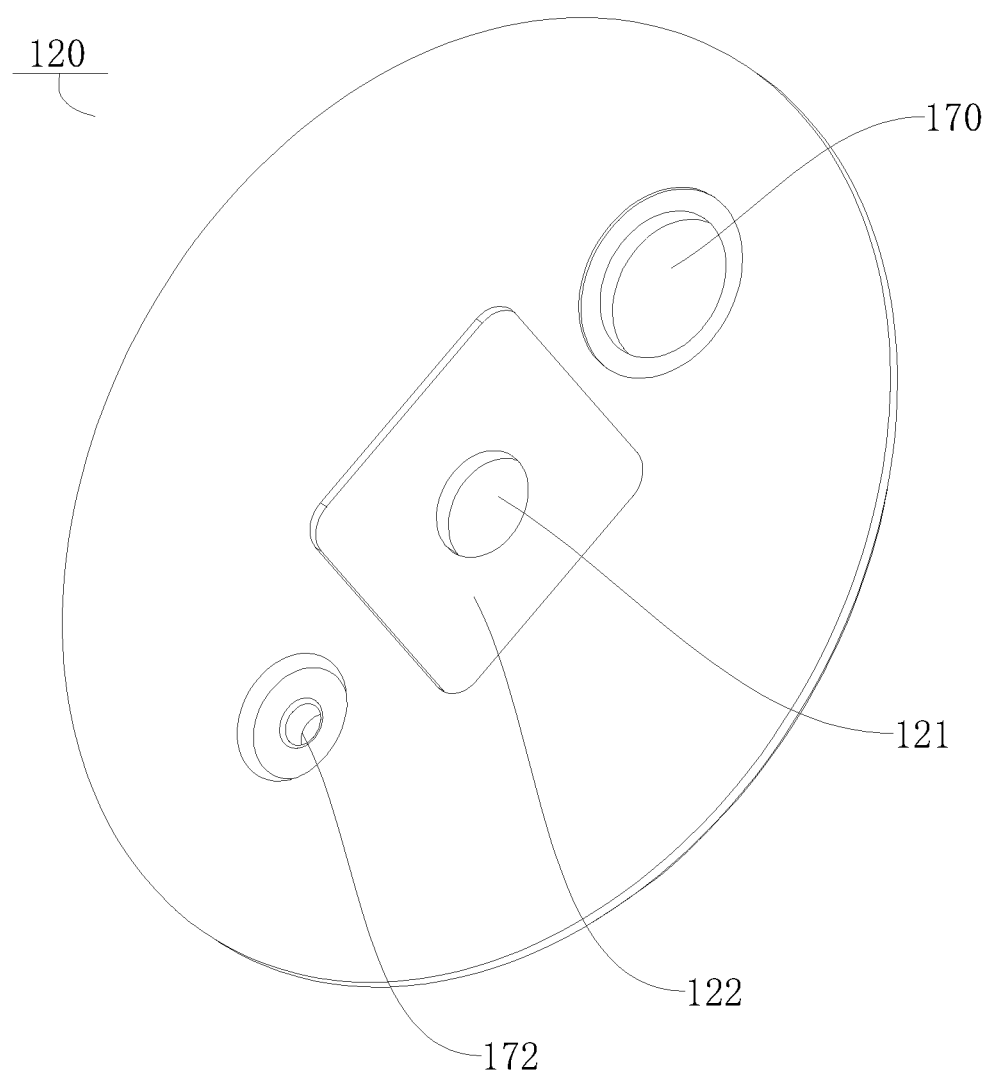
FIG. 25 is an isometric view of a top cover plate in FIG. 9 from one view.
Figure 26:
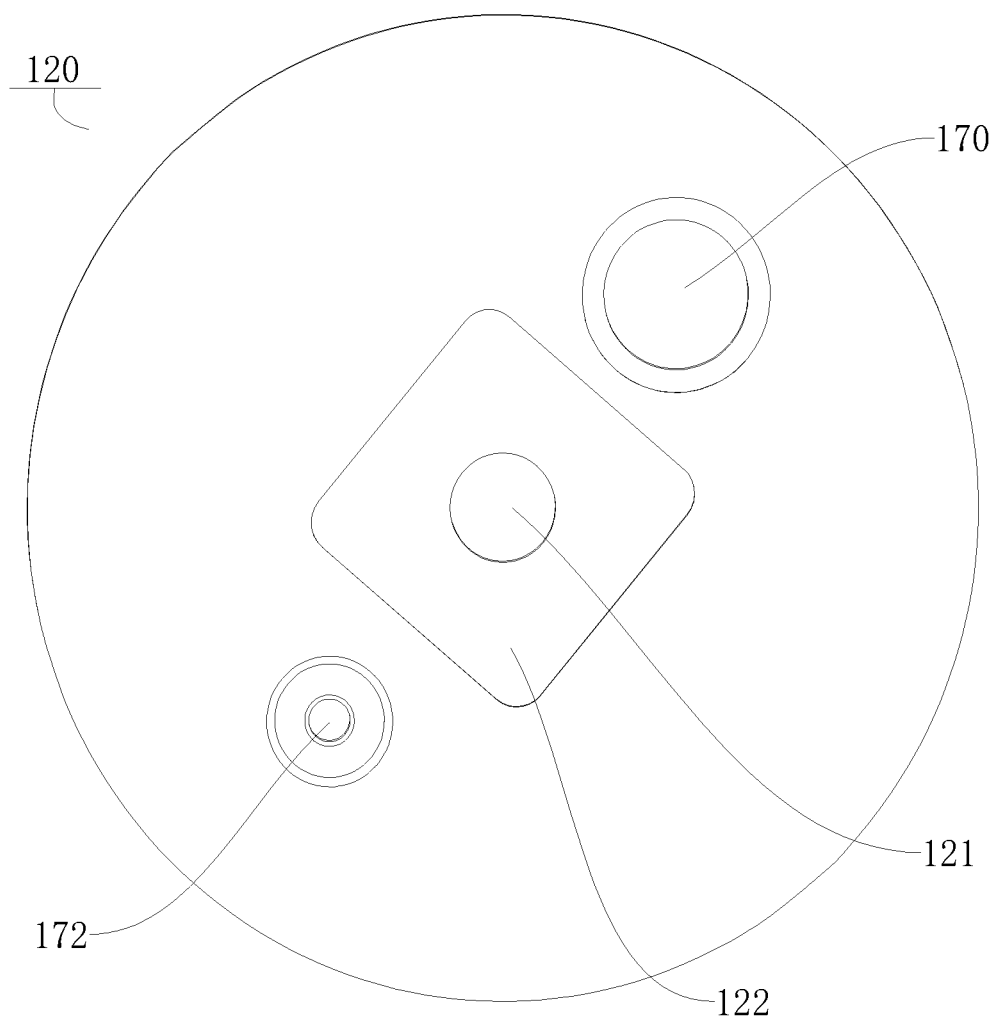
FIG. 26 is a top view of the top cover plate in FIG. 9.
Figure 27:
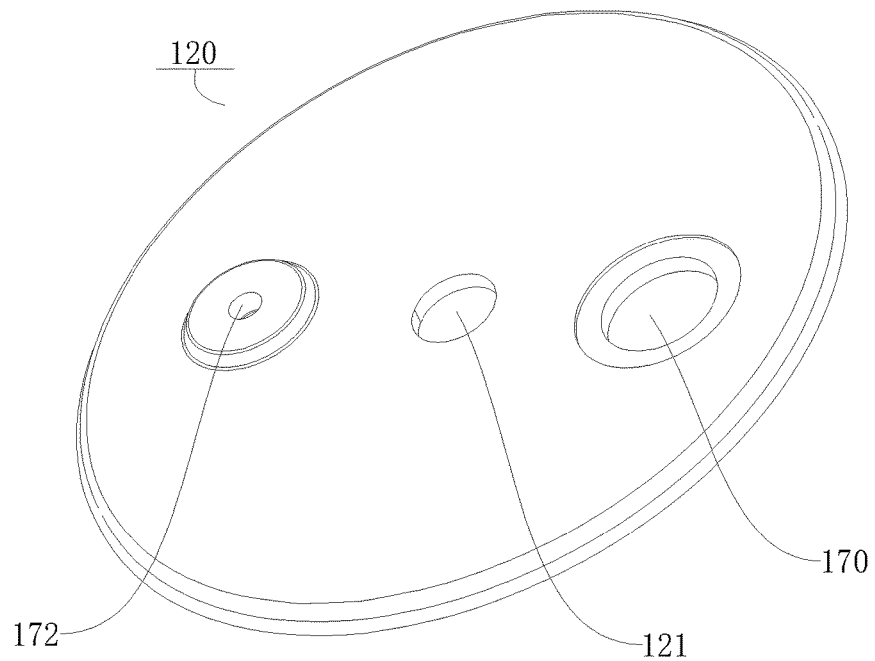
FIG. 27 is an isometric view of the top cover plate in FIG. 9 from another view.

According to some implementations of the disclosure, as illustrated in FIG. 25 and FIG. 26, the top cover plate 120 defines an anti-rotation groove 122. The through hole 121 extends through a bottom of the anti-rotation groove 122. As illustrated in FIGS. 14-16, the insulating member 130 has an anti-rotation flange 136 on a circumferential wall of the insulating member 130. The anti-rotation flange 136 is embedded in the anti-rotation groove 122. Thus, when the insulating member 130 is assembled with the top cover plate 120, the anti-rotation flange 136 has a limiting effect on the insulating member 130 in the circumferential direction of the through hole 121, which can prevent the insulating member 130 from rotating relative to the top cover plate 120.

Further, as illustrated in FIGS. 14-16, the anti-rotation flange 136 includes a first anti-rotation edge 137 and a second anti-rotation edge 138. The first anti-rotation edge 137 and the second anti-rotation edge 138 define an included angle. The included angle may be 90°. An intersection of the first anti-rotation edge 137 and the second anti-rotation edge 138 has a smooth transition. Here, it is noted that, as illustrated in FIG. 16, when the insulating member 130 has a tendency to rotate clockwise, the second anti-rotation edge 138 can abut against an inner circumferential wall of the anti-rotation groove 122 to prevent rotation. When the insulating member 130 has a tendency to rotate counter-clockwise, the first anti-rotation edge 137 can abut against the inner circumferential wall of the anti-rotation groove 122 to prevent rotation. In order to improve an anti-rotation effect, in some examples, the anti-rotation flange 136 includes multiple anti-rotation flanges 136 spaced apart in a circumferential direction of the insulating member 130. Further, the anti-rotation groove 122 may be square.

In some implementations, as illustrated in FIG. 25 and FIG. 26, the top cover assembly 100 defines an explosion-proof hole 170 and a liquid-injection hole 172. It is noted here that the battery 1000 includes the top cover assembly, a battery core, and a cylindrical hard case 200. One end of the hard case 200 is closed, and the other end of the hard case 200 is open. The top cover assembly 100 can be disposed on the open end of the hard case to seal the hard case 200. The battery core is disposed inside the hard case 200. The explosion-proof hole 170 extends through the top cover plate 120 and the insulating cover plate 110 in sequence, and communicates with the interior of the hard case 200. Similarly, the liquid-injection hole 172 extends through the top cover plate 120 and the insulating cover plate 110 in sequence, and communicates with the interior of the hard case 200. In order to improve safety of the battery 1000, an explosion-proof valve 171 may be disposed at the explosion-proof hole 170. In order to ensure sealing of the battery 1000, after the liquid injection process, the liquid-injection hole 172 can be sealed by a liquid-injection-hole plug 173.

Figure 23:
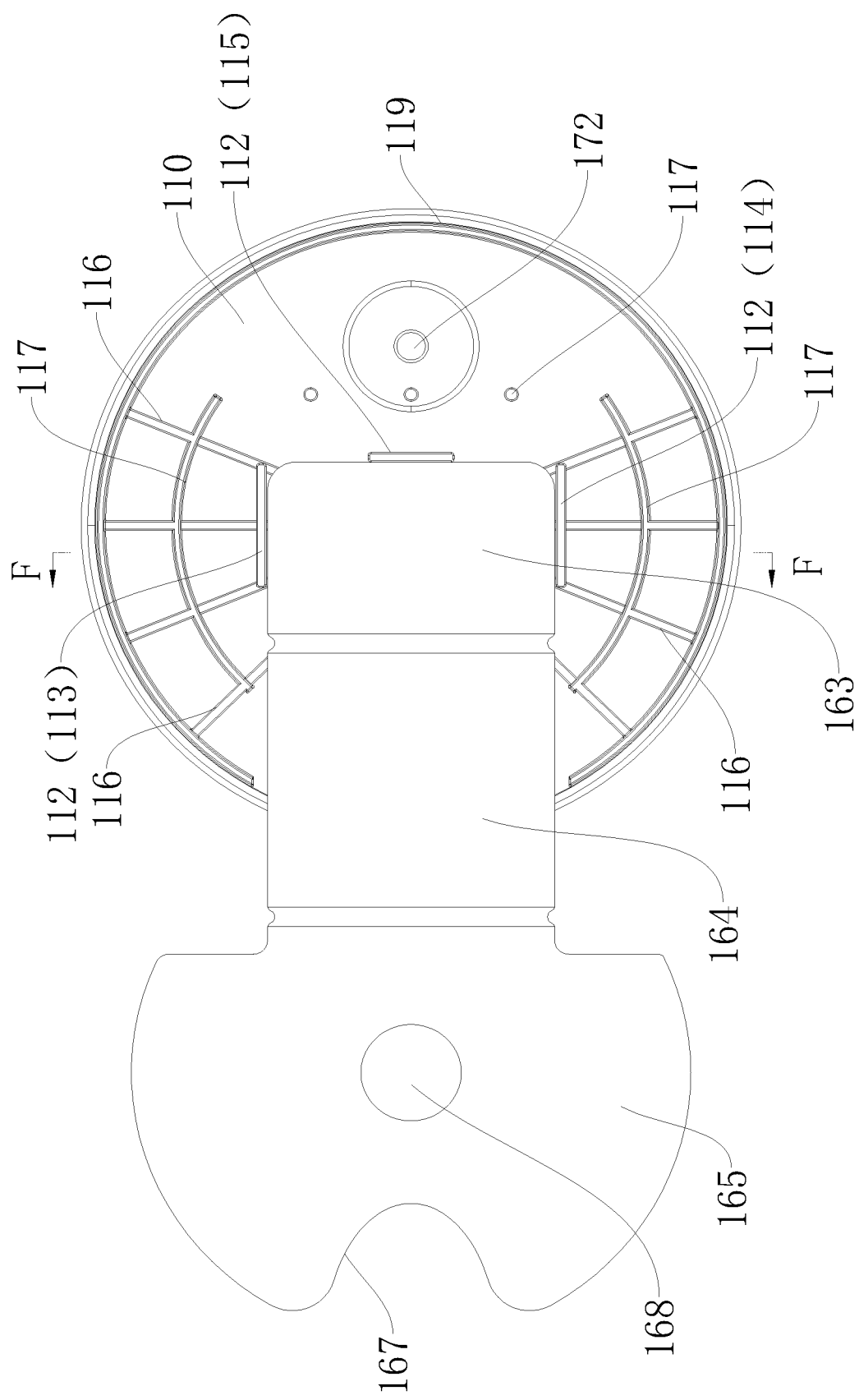
FIG. 23 is a schematic view of an assembly of the insulating cover plate and a current collector in FIG. 9.
Figure 24:
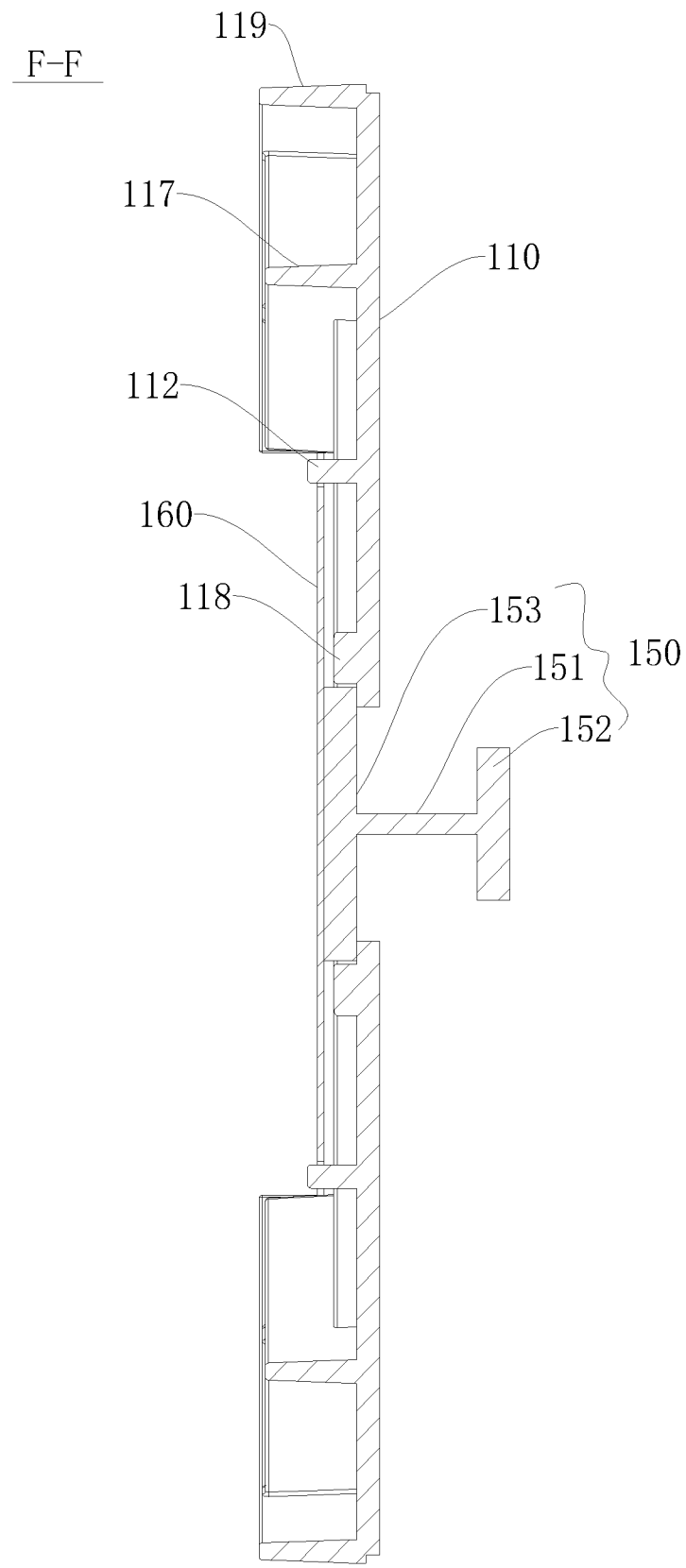
FIG. 24 is a cross-sectional view in direction F-F in FIG. 23.

It is noted that, as illustrated in FIG. 23 and FIG. 24, the top cover assembly 100 may further include the current collector 160. The current collector 160 is welded with the pole 150. The current collector 160 is located on one side of the insulating cover plate 110 away from the insulating member 130. According to some implementations of the disclosure, the insulating cover plate 110 has multiple limiting ribs 112 on one side of the insulating cover plate 110 away from the top cover plate 120. The multiple limiting ribs 112 define a clamping groove, which defines a mounting position of the current collector 160. It is noted that, when welding the current collector 160 and the pole 150, a relative position between the current collector 160 and the pole 150 needs to be determined. By defining the clamping groove with the limiting ribs 112 and positioning the current collector 160 with the clamping groove, assembling the current collector 160 can be facilitated.

Figure 19:
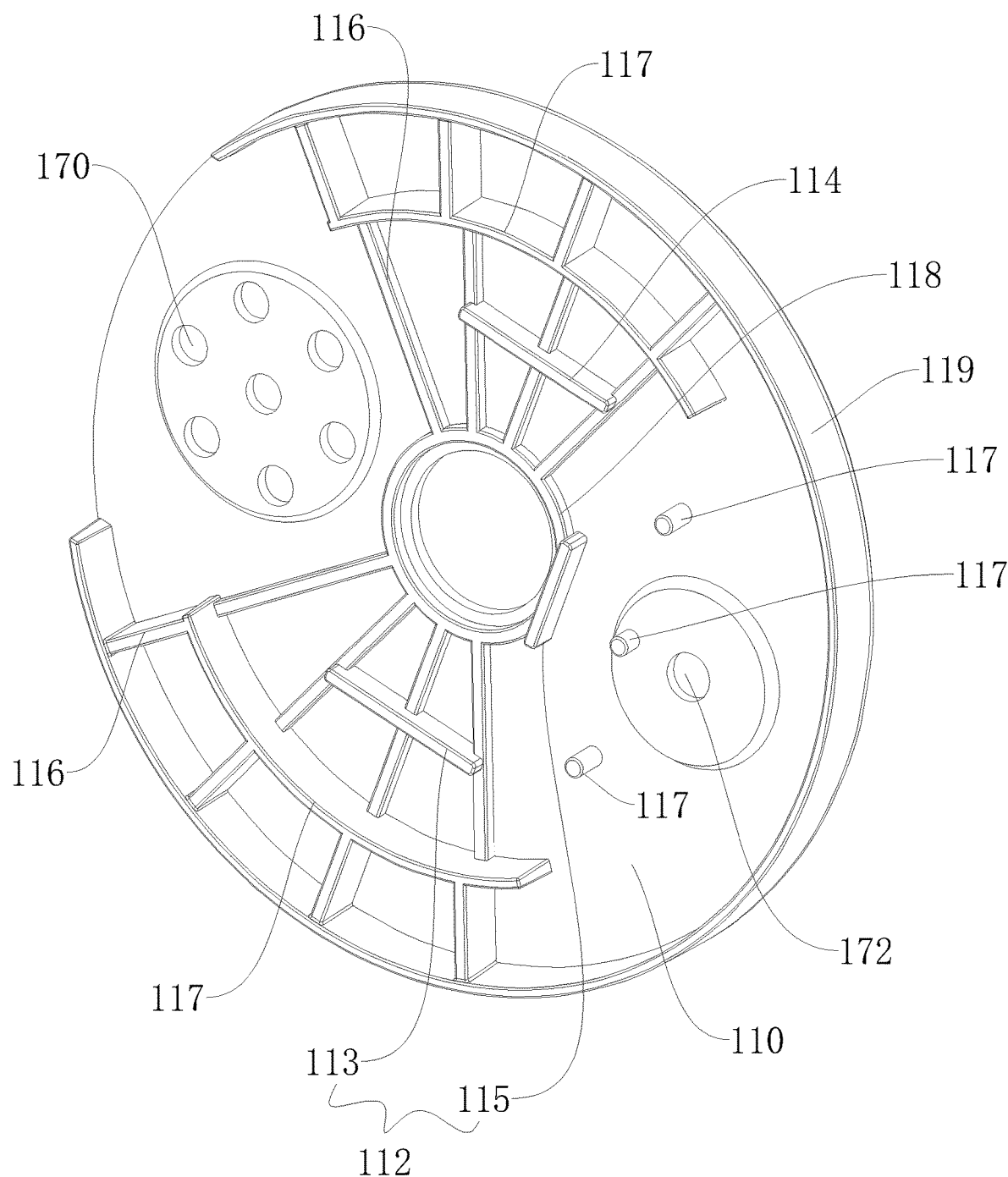
FIG. 19 is an isometric view of the insulating cover plate in FIG. 9 from another view.
Figure 20:
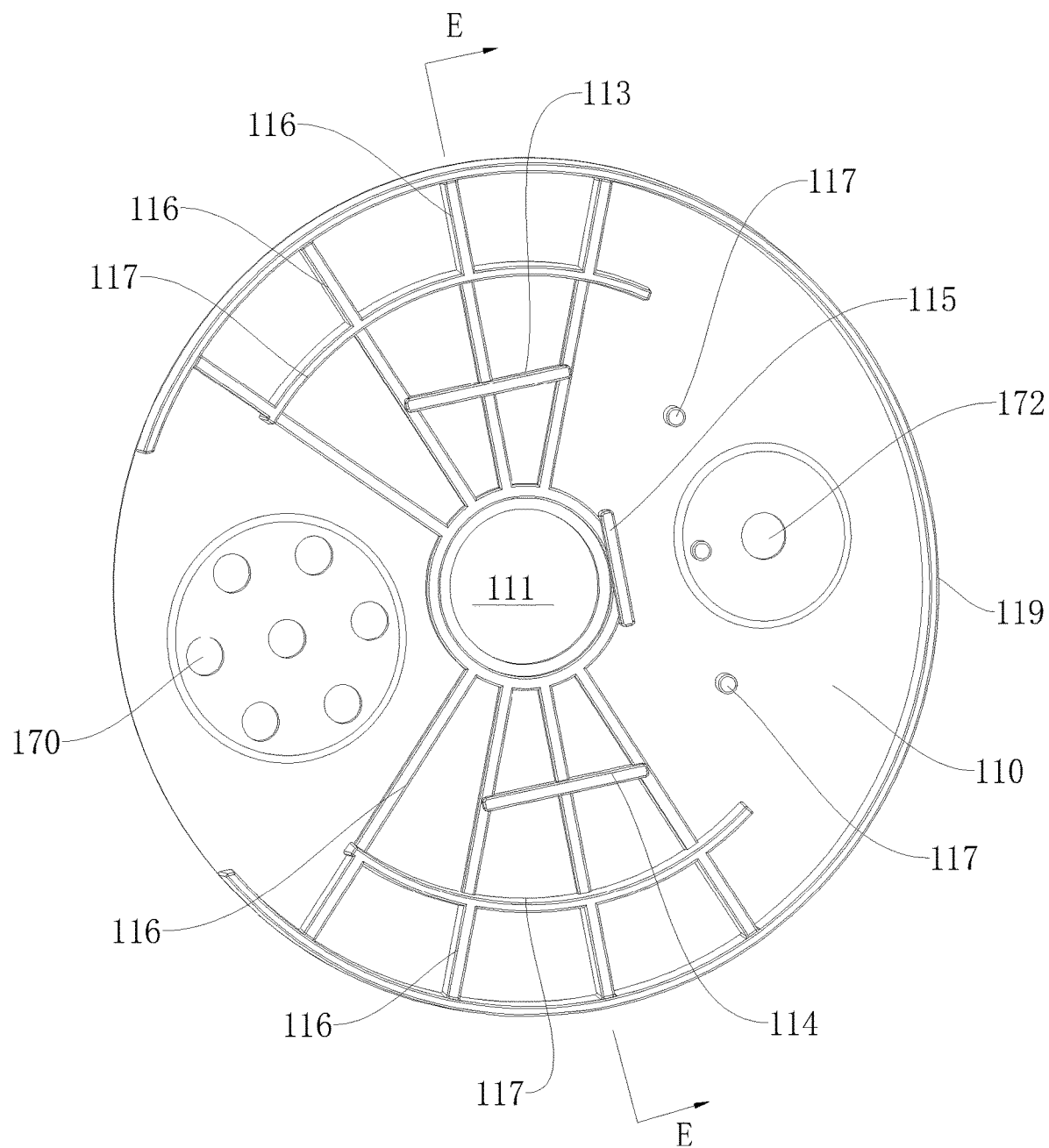
FIG. 20 is a top view of the insulating cover plate in FIG. 9.

An arrangement of the limiting ribs 112 is not limited herein, as long as it can limit the current collector 160. For example, in some examples, as illustrated in FIG. 19, FIG. 20, and FIG. 23, the limiting rib 112 may be three limiting ribs 112, which include a first limiting rib 113, a second limiting rib 114, and a third limiting rib 115. The first limiting rib 113 is parallel to and opposite to the second limiting rib 114. The current collector 160 is between the first limiting rib 113 and the second limiting rib 114, that is, between two parallel limiting ribs 112. The third limiting rib 115 is located at an end of the current collector 160, and the third limiting rib 115 is parallel to an edge of the end of the current collector 160. The third limiting rib 115 is perpendicular to the first limiting rib 113.

Further, in order to strengthen structural strength of the insulating cover plate 110, as illustrated in FIG. 19 and FIG. 20, one side of the insulating cover plate 110 away from the top cover plate 120 has multiple reinforcing ribs 116. In an implementation, the multiple reinforcing ribs 116 are arranged radially with the mounting hole 111 as the center of a circle. Furthermore, at least one of the reinforcing ribs 116 intersects with the limiting rib 112 to form a cross-rib structure, and the cross-rib structure can further improve the structural strength of the top cover plate 120.

Figure 21:
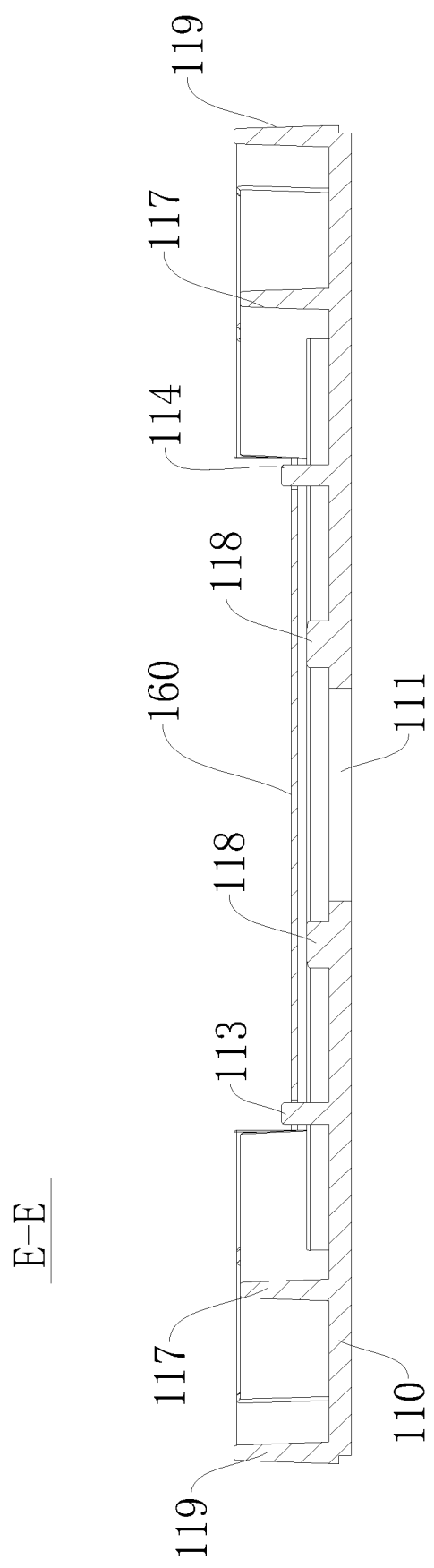
FIG. 21 is a cross-sectional view of the insulating cover plate in FIG. 9.
Figure 22:
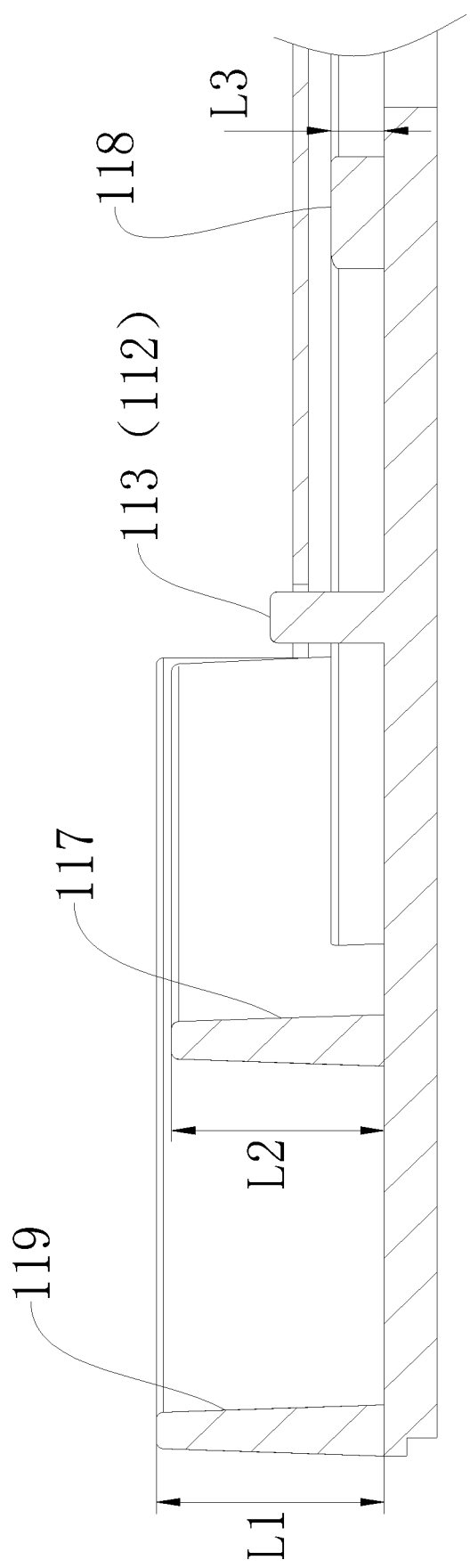
FIG. 22 is a partial structural schematic view of the insulating cover plate in FIG. 21.

According to some implementations of the disclosure, as illustrated in FIGS. 20-22, the insulating cover plate 110 has an abutment portion 117 on one side of the insulating cover plate 110 away from the top cover plate 120. The abutment portion 117 supports the current collector 160. It is noted that the current collector 160 can be accommodated on one side of the insulating cover plate 110 by folding. During assembling the top cover assembly 100, the assembly force exerts a pressing effect on the current collector 160. With aid of the abutment portion 117, the current collector 160 can be supported and protected. Further, the abutment portion 117 may be in a long-strip shape. The abutment portion 117 may extend to have a shape similar to an edge of the current collector 160. For example, the current collector 160 may be an arc-shaped rib. Further, as illustrated in FIG. 20, two abutment portions 117 symmetrically distributed with respect to the mounting hole 111. It is noted here that the shape of the abutment portion 117 is not limited herein. For example, in some implementations, the abutment portion 117 is cylindrical, and multiple abutment portions 117 are arranged at intervals.

In order to improve assembly stability of the pole 150, in some implementations, the insulating cover plate 110 has a protective flange 118 on one side of the insulating cover plate 110 away from the top cover plate 120. The protective flange 118 surrounds an outer circumference of the pole 150.

As such, a contact area between the inner circumferential wall of the mounting hole 111 and the pole 150 can be increased, and the pole 150 can be protected and supported by the protective flange 118 to prevent the pole 150 from being deformed or inclined. In addition, the protective flange 118 can increase the structural strength of the insulating cover plate 110, that is, the protective flange 118 can act as the reinforcing rib 116 to increase the structural strength of the insulating cover plate 110.

Figure 18:
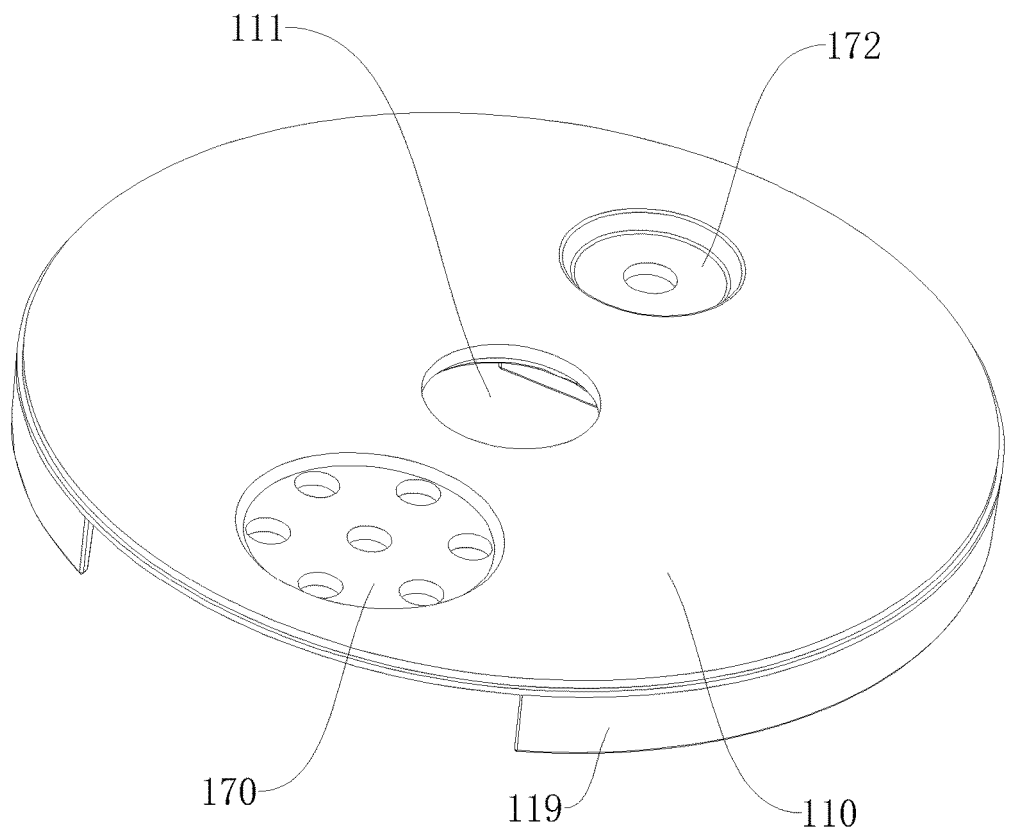
FIG. 18 is an isometric view of an insulating cover plate in FIG. 9 from one view.

As illustrated in FIG. 18, according to some implementations of the disclosure, the insulating cover plate 110 has a bending edge 119 on one side of the insulating cover plate 110 away from the top cover plate 120. The bending edge 119 is located at an edge of the insulating cover plate 110 and extends in a circumferential direction of the insulating cover plate 110. On the one hand, the bending edge 119 can increase the structural strength of the insulating cover plate 110. On the other hand, with the bending edge 119, a substantially closed receiving space can be formed to accommodate the current collector 160 and protect the current collector 160 from being squeezed and collided.

In order to better accommodate the current collector 160, in some implementations, as illustrated in FIG. 21 and FIG. 22, a height of the bending edge 119 is larger than a height of the abutment portion 117. As such, a height difference between the bending edge 119 and the abutment portion 117 can define a reserved space, and part of the current collector 160 can be accommodated in the reserved space. It is noted that, when the current collector 160 is assembled with the insulating cover plate 110, the current collector 160 needs to be folded. Due to different layers of folding, the current collector 160 has different thicknesses at different regions. In order to better accommodate the folded current collector 160, in some implementations, as illustrated in FIG. 21 and FIG. 22, the height of the abutment portion 117 is larger than the height of the protective flange 118. As such, a height difference between the abutment portion 117 and the protective flange 118 can also define a reserved space to accommodate the current collector 160. For example, as illustrated in FIG. 22, the height of the bending edge 119 is L1, the height of the abutment portion 117 is L2, and the height of the protective flange 118 is L3, where L1>L2>L3.

In order to better protect the current collector 160, in some implementations, the height difference between the bending edge 119 and the protective flange 118 is larger than a thickness of a space occupied by the current collector 160. As such, the current collector 160 can be completely accommodated in the reserved space defined by the bending edge 119 and the abutment portion 117. For example, the mounting portion may be the bending edge 119, the limiting ribs 112, or other mounting structures, which are not limited herein.

Figure 28:
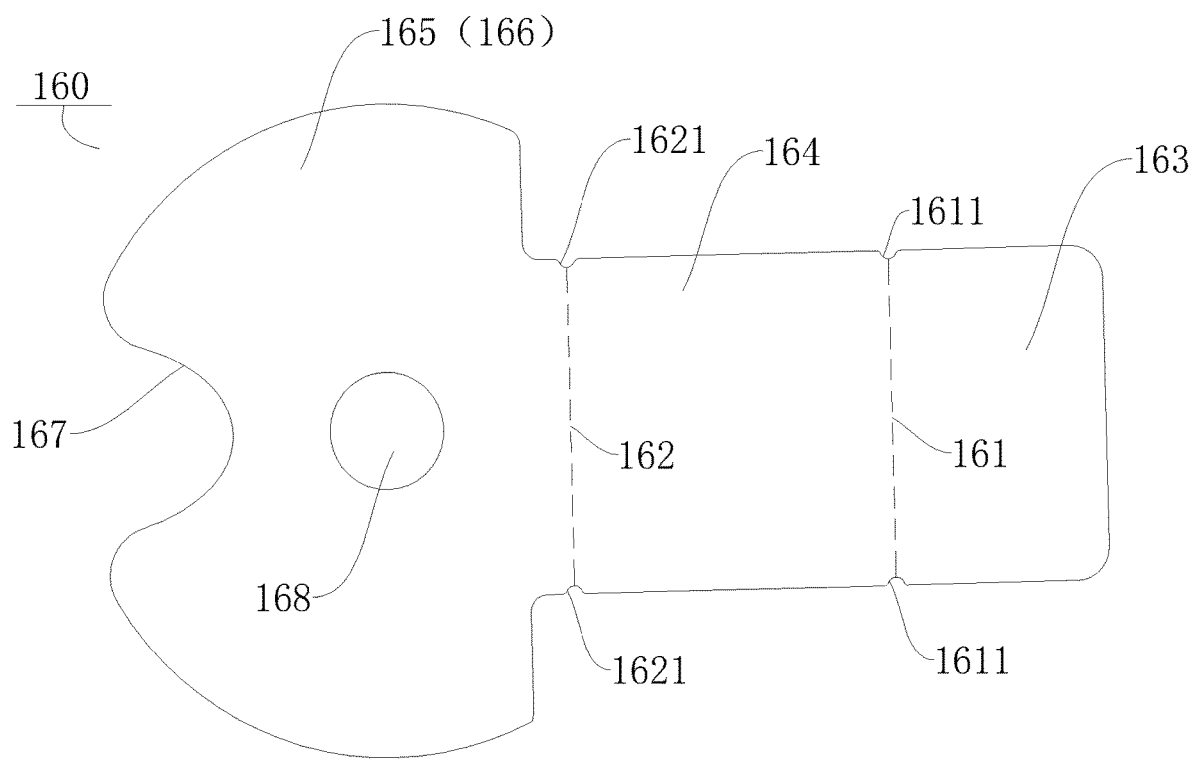
FIG. 28 is a top view of the current collector in FIG. 9, the current collector is in a deployed state.
Figure 29:
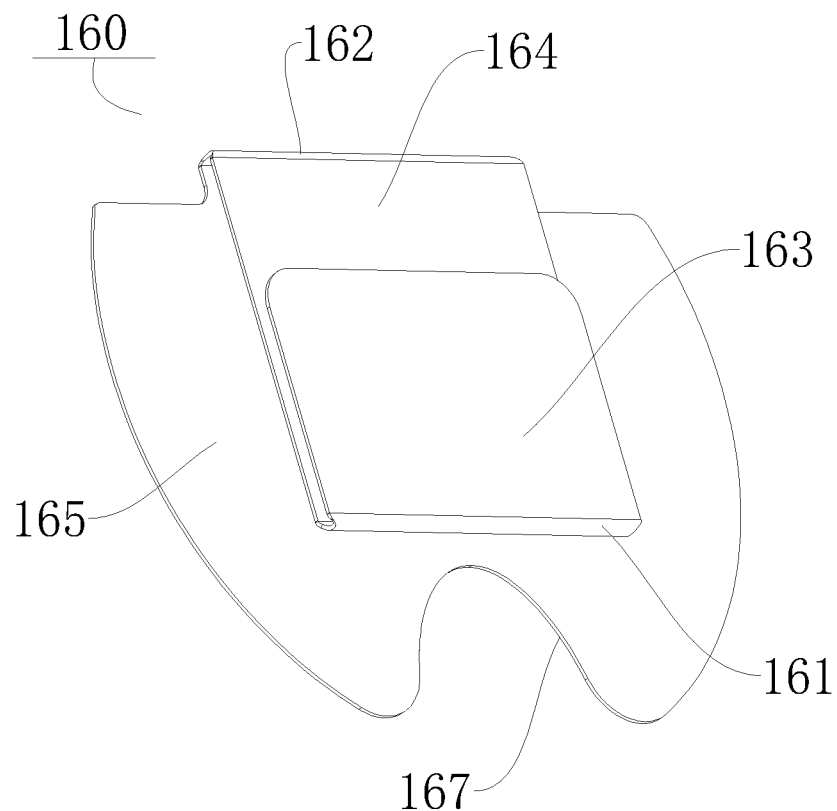
FIG. 29 is a schematic structural view of the current collector in FIG. 9, the current collector is in a folded state.

According to some implementations of the disclosure, as illustrated in FIG. 28 and FIG. 29, the current collector 160 has a first crease 161 and a second crease 162. The first crease 161 is spaced apart from the second crease 162 in a length direction of the current collector 160. The first crease 161 and the second crease 162 extend in a width direction of the current collector 160. The current collector 160 is divided by the first crease 161 and the second crease 162 into a first part 163, a second part 164, and a third part 165. The first part 163 is bent toward one side of the second part 164 and welded with the pole 150. The third part 165 is bent toward the other side of the second part 164 to be welded with the battery core.

It is noted that, when folding the current collector 160, the current collector 160 is folded in two different directions, so that the first part 163 and the third part 165 can be spaced apart by the second part 164 when the current collector 160 is folded. As such, when the first part 163 is welded with the pole 150, an influence of the welding process on the third part 165 can be reduced. Similarly, when the third part 165 is welded with tabs of the battery cell, an influence of the welding process on the first part 163 can also be reduced.

Figure 30:
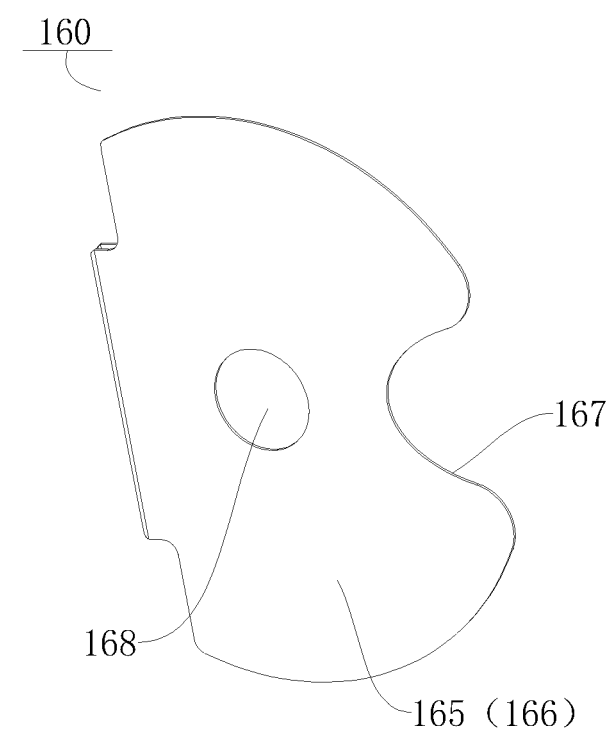
FIG. 30 is a schematic structural view of the current collector in FIG. 9, the current collector is in a folded state.
Figure 31:
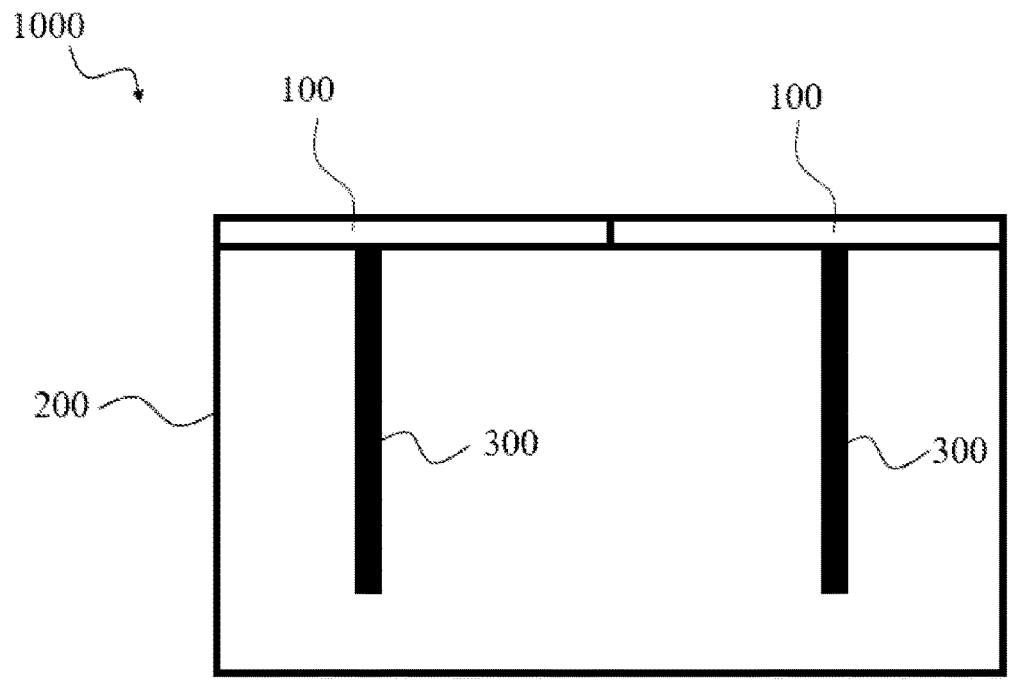
FIG. 31 is a schematic structural view of a battery according to implementations of the disclosure.
Figure 32:
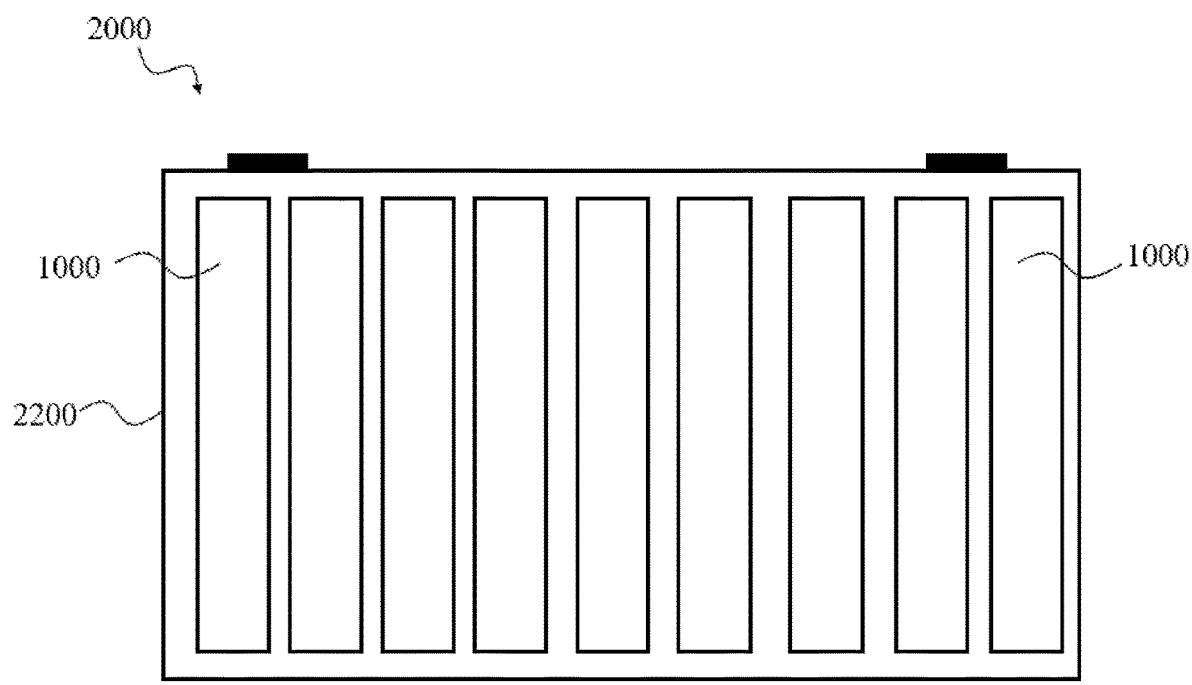
FIG. 32 is a schematic structural view of an energy storage device according to implementations of the disclosure.

In addition, in the length direction of the current collector 160, a length of the first part 163 is smaller than a length of the second part 164. As such, when the current collector 160 is folded, parts of the current collector 160 can be staggered, so that an overall thickness of the folded current collector 160 may have a stepwise change. On the one hand, the current collector 160 can be accommodated on one side of the insulating member 130. On the other hand, functional regions or avoidance structures can be set on different parts. For example, as illustrated in FIG. 28 and FIG. 30, the third part 165 has an enlarged section 166, a width of the enlarged section 166 is larger than that of the second part 164. The enlarged section 166 has an avoidance gap 167. The avoidance gap 167 can avoid explosion-proof valve. The avoidance gap 167 extends through part of an edge of the enlarged section 166. Further, the enlarged section 166 has an avoidance hole 168 opposite to one end of the pole 150.

In some implementations, as illustrated in FIG. 28, at least one of the first crease 161 and the second crease 162 extends along a straight line, which facilitates folding of the current collector 160. It is noted that, when the current collector 160 is folded, due to ductility of a material of the current collector 160, material accumulation is prone to occur at crease positions. In order to solve this technical problem, in some implementations of the disclosure, as illustrated in FIG. 28, the first crease 161 have first grooves 1611 at both ends thereof, and the second crease 162 have second grooves 1621 at both ends thereof.

A battery 1000 according to the implementations of the disclosure includes a case 200, a top cover assembly 100 covering the case 200, and an electrode pin 300 electrically coupled with the top cover assembly 100 and received in the case 200. The battery 1000 further includes a battery core. In an implementation, the case 200 can be a cylindrical hard case 200, and the top cover assembly 100 is described above. It is noted that the battery 1000 can be a single cell, and multiple single-cells can be assembled into a battery pack, an energy storage device 2000, or a charging station. One end of the hard case 200 is closed, and the other end of the hard case 200 is open. The top cover assembly 100 can be arranged at the open end of the hard case 200 to seal the hard case 200. The battery core is disposed inside the hard case 200. For example, the battery 1000 may be a secondary battery.

In the battery 1000 according to the implementations of the disclosure, the sealing cavity 154 is formed through the pole 150, the pressing block 140, the insulating member 130, the top cover plate 120, and the insulating cover plate 110, and the sealing cavity 154 is in communication with the gap 155 between the inner circumferential wall of the through hole 121 and the outer circumferential wall of the main body 151. When the sealing member 156 is assembled into the sealing cavity 154, part of the sealing member 156 can be deformed to block an opening 157 under the action of an extrusion force, which improves the sealing effect of the sealing member 156.

The energy storage device 2000 according to implementations of the disclosure includes a housing 2200 and multiple above-mentioned batteries 1000. The multiple batteries 1000 are received in the housing 2200. In the energy storage device 2000 according to the implementations of the disclosure, the sealing cavity is constructed by using the pole 150, the pressing block 140, the insulating member 130, the top cover plate 120, and the insulating cover plate 110, and the sealing cavity 154 is in communication with the gap 155 between the inner circumferential wall of the through hole 121 and the outer circumferential wall of the main body 151. When the sealing member 156 is assembled into the sealing cavity 154, part of the sealing member 156 can be deformed under the action of an extrusion force to block an opening 157, which improves the sealing effect of the sealing member 156.

In the description of the disclosure, descriptions with reference to terms such as "one implementation", "some implementations", "examples", "specific examples", or "some examples" mean that specific features, structures, materials, or characteristics described in combination with the implementations or examples are included in at least one implementation or example of the disclosure. The schematic expressions of the above terms herein do not necessarily refer to the same implementation or example.

Although the implementations of the disclosure have been illustrated and described, it is appreciated by those of ordinary skill in the art that various variations, modifications, replacements, and variants of these implementations can be made without departing from the principles and purposes of the disclosure, the scope of disclosure is defined by the claims and their equivalents.

What is claimed is:

1. A top cover assembly for a battery, comprising:
an insulating cover plate defining a mounting hole;
a top cover plate stacked with the insulating cover plate and defining a through hole, the through hole being opposite to the mounting hole;
an insulating member located on a side of the top cover plate away from the insulating cover plate and defining a positioning hole, the positioning hole being opposite to the through hole;
a current collector welded with a pole and disposed on a side of the insulating cover plate away from the insulating member; and
the pole having a main body and a first flange, wherein the first flange is located at an edge of one end of the main body close to the current collector, projects from a circumferential wall surface of the main body, and abuts against the insulating cover plate, and the main body extends through the positioning hole, the through hole, and the mounting hole, wherein
a surface of the first flange close to the insulating member, an inner circumferential wall of the mounting hole, and a surface of the top cover plate close to the first flange and extending beyond the inner circumferential wall of the mounting hole define a sealing cavity, an inner circumferential wall of the through hole and an outer circumferential wall of the main body define a gap therebetween, the gap communicates with the sealing cavity, and a sealing member is received in the sealing cavity;
the insulating cover plate has an abutment portion, a protective flange, and a bending edge that are on one side of the insulating cover plate away from the top cover plate, wherein the abutment portion supports the current collector, the protective flange surrounds an outer circumference of the pole, and the bending edge is located at an edge of the insulating cover plate and extends in a circumferential direction of the insulating cover plate, and wherein a height of the bending edge is L1, a height of the abutment portion is L2, a height of the protective flange is L3, and L1>L2>L3.

2. The top cover assembly for a battery of claim 1, wherein the sealing member is sleeved on the main body and abuts against the first flange.

3. The top cover assembly for a battery of claim 1, wherein the top cover plate has a stepped portion abutting against the sealing member.

4. The top cover assembly for a battery of claim 1, further comprising a pressing block, the pressing block being disposed on a side of the insulating member away from the top cover plate and defining a limiting hole opposite to the positioning hole.

5. The top cover assembly for a battery of claim 4, wherein the pressing block has a fitting protrusion on a side of the pressing block close to the insulating member, the insulating member defines a fitting groove on a side of the insulating member close to the pressing block, and the fitting protrusion fits with the fitting groove.

6. The top cover assembly for a battery of claim 4, wherein
the pole further has a second flange, the second flange is located at an edge of the other end of the main body and projects from the circumferential wall surface of the main body, the second flange extends in a circumferential direction of the main body and abuts against the pressing block.

7. The top cover assembly for a battery of claim 6, wherein the pressing block, the insulating member, the top cover plate, and the insulating cover plate are sandwiched between the second flange and the first flange.

8. The top cover assembly for a battery of claim 6, wherein the mounting hole has a cross-section gradually decreased in area in a direction from the first flange to the second flange.

9. The top cover assembly for a battery of claim 8, wherein
the limiting hole has a first hole section, a second hole section, and a third hole section which communicate in sequence, the first hole section has a radial size larger than the second hole section, the second flange is received in the second hole section, and part of the main body is received in the third hole section.

10. The top cover assembly for a battery of claim 4, wherein the limiting hole has a first chamfer on an end of the limiting hole close to the insulating member.

11. The top cover assembly for a battery of claim 1, wherein
the top cover plate defines an anti-rotation groove, and the through hole is defined in the anti-rotation groove;
the insulating member has at least one anti-rotation flange on a circumferential wall of the insulating member; and
the at least one anti-rotation flange is embedded in the anti-rotation groove.

12. The top cover assembly for a battery of claim 11, wherein the anti-rotation flange comprises a first anti-rotation edge and a second anti-rotation edge, and the first anti-rotation edge and the second anti-rotation edge define an included angle.

13. The top cover assembly for a battery of claim 11, wherein the at least one anti-rotation flange comprises a plurality of anti-rotation flanges spaced apart in a circumferential direction of the insulating member.

14. The top cover assembly for a battery of claim 11, wherein the anti-rotation groove is square.

15. The top cover assembly for a battery of claim 1, wherein the insulating member has a boss on a side of the insulating member close to the top cover plate, the positioning hole extends through the boss, and the boss is received in the through hole.

16. The top cover assembly for a battery of claim 15, wherein the boss has a second chamfer between an end surface of the boss and an inner circumferential wall of the positioning hole.

17. The top cover assembly for a battery of claim 15, wherein the boss has a third chamfer between an end surface and an outer circumferential wall of the boss.

18. A battery, comprising a top cover assembly for a battery, wherein the top cover assembly comprises:
   an insulating cover plate defining a mounting hole;
   a top cover plate stacked with the insulating cover plate and defining a through hole, the through hole being opposite to the mounting hole;
   an insulating member located on a side of the top cover plate away from the insulating cover plate and defining a positioning hole, the positioning hole being opposite to the through hole;
   a current collector welded with a pole and disposed on a side of the insulating cover plate away from the insulating member; and
   the pole having a main body and a first flange, wherein the first flange is located at an edge of one end of the main body close to the current collector, projects from a circumferential wall surface of the main body, and abuts against the insulating cover plate, and the main body extends through the positioning hole, the through hole, and the mounting hole, wherein
   a surface of the first flange close to the insulating member, an inner circumferential wall of the mounting hole, and a surface of the top cover plate close to the first flange and extending beyond the inner circumferential wall of the mounting hole define a sealing cavity, an inner circumferential wall of the through hole and an outer circumferential wall of the main body define a gap therebetween, the gap communicates with the sealing cavity, and a sealing member is received in the sealing cavity;
   the insulating cover plate has an abutment portion, a protective flange, and a bending edge that are on one side of the insulating cover plate away from the top cover plate, wherein the abutment portion supports the current collector, the protective flange surrounds an outer circumference of the pole, and the bending edge is located at an edge of the insulating cover plate and extends in a circumferential direction of the insulating cover plate, and wherein a height of the bending edge is L1, a height of the abutment portion is L2, a height of the protective flange is L3, and L1>L2>L3.

19. The battery of claim 18, wherein the sealing member is sleeved on the main body and abuts against the first flange.

20. An energy storage device, comprising a battery comprising a top cover assembly for a battery, wherein the top cover assembly comprises:
   an insulating cover plate defining a mounting hole;
   a top cover plate stacked with the insulating cover plate and defining a through hole, the through hole being opposite to the mounting hole;
   an insulating member located on a side of the top cover plate away from the insulating cover plate and defining a positioning hole, the positioning hole being opposite to the through hole;
   a current collector welded with a pole and disposed on a side of the insulating cover plate away from the insulating member; and
   the pole having a main body and a first flange, wherein the first flange is located at an edge of one end of the main body close to the current collector, projects from a circumferential wall surface of the main body, and abuts against the insulating cover plate, and the main body extends through the positioning hole, the through hole, and the mounting hole, wherein
   a surface of the first flange close to the insulating member, an inner circumferential wall of the mounting hole, and a surface of the top cover plate close to the first flange and extending beyond the inner circumferential wall of the mounting hole define a sealing cavity, an inner circumferential wall of the through hole and an outer circumferential wall of the main body define a gap therebetween, the gap communicates with the sealing cavity, and a sealing member is received in the sealing cavity;
   the insulating cover plate has an abutment portion, a protective flange, and a bending edge that are on one side of the insulating cover plate away from the top cover plate, wherein the abutment portion supports the current collector, the protective flange surrounds an outer circumference of the pole, and the bending edge is located at an edge of the insulating cover plate and extends in a circumferential direction of the insulating cover plate, and wherein a height of the bending edge is L1, a height of the abutment portion is L2, a height of the protective flange is L3, and L1>L2>L3.

* * * * *